US011035762B2

(12) United States Patent
Nakanishi et al.

(10) Patent No.: US 11,035,762 B2
(45) Date of Patent: Jun. 15, 2021

(54) SMEAR PREPARING APPARATUS AND SMEAR PREPARING METHOD

(71) Applicant: SYSMEX CORPORATION, Kobe (JP)

(72) Inventors: Noriyuki Nakanishi, Kobe (JP); Masahiko Fukushima, Kobe (JP); Seiya Shinabe, Kobe (JP); Mitsuo Yamasaki, Kobe (JP)

(73) Assignee: SYSMEX Corporation, Kobe (JP)

( * ) Notice: Subject to any disclaimer, the term of this patent is extended or adjusted under 35 U.S.C. 154(b) by 780 days.

(21) Appl. No.: 15/603,511

(22) Filed: May 24, 2017

(65) Prior Publication Data

US 2017/0343454 A1    Nov. 30, 2017

(30) Foreign Application Priority Data

May 26, 2016    (JP) .............................. JP2016-105390

(51) Int. Cl.
| | |
|---|---|
| *G01N 1/00* | (2006.01) |
| *G01N 1/28* | (2006.01) |
| *G01N 1/31* | (2006.01) |
| *G01N 35/00* | (2006.01) |
| *G02B 21/34* | (2006.01) |
| *G01N 35/04* | (2006.01) |

(52) U.S. Cl.
CPC .......... *G01N 1/2813* (2013.01); *G01N 1/312* (2013.01); *G01N 35/00029* (2013.01); *G02B 21/34* (2013.01); *G01N 2035/00039* (2013.01); *G01N 2035/00138* (2013.01); *G01N 2035/00168* (2013.01); *G01N 2035/0425* (2013.01)

(58) Field of Classification Search
CPC ....................................................... G01N 1/00
See application file for complete search history.

(56) References Cited

U.S. PATENT DOCUMENTS 6,268,208 B1    7/2001    Kondo
6,319,470 B1    11/2001    Lefevre et al.
(Continued)

FOREIGN PATENT DOCUMENTS

CN        1726275 A       1/2006
CN      101464237 A       6/2009
(Continued)

OTHER PUBLICATIONS

Communication pursuant to Article 94(3) EPC dated Oct. 28, 2019 in a counterpart European patent application.
(Continued)

*Primary Examiner* — Jyoti Nagpaul
(74) *Attorney, Agent, or Firm* — Metrolex IP Law Group, PLLC

(57) ABSTRACT

A smear preparing apparatus according to one or more embodiments includes: a first transporter that transports a storage tool in a first direction, the storage tool capable of holding microscope slides side by side in the first direction; a slide transfer unit that transfers a microscope slide having a stained sample to the storage tool transported by the first transporter; and a second transporter that is adjacent to the first transporter and that transports the storage tool housing the microscope slide transferred by the slide transfer unit, in a second direction opposite to the first direction.

19 Claims, 9 Drawing Sheets

(56) References Cited

U.S. PATENT DOCUMENTS

| | | | |
|---|---|---|---|
| 9,329,196 B2 * | 5/2016 | Ohmae | ................ G01N 35/04 |
| 2009/0087904 A1 | 4/2009 | Heid et al. | |

FOREIGN PATENT DOCUMENTS

| | | |
|---|---|---|
| CN | 103713144 A | 4/2014 |
| CN | 103713146 A | 4/2014 |
| EP | 1367398 A2 | 12/2003 |
| EP | 3239715 A1 | 11/2017 |
| JP | 2000-074803 A | 3/2000 |

OTHER PUBLICATIONS

Chinese office action letter dated Sep. 4, 2019 in a counterpart Chinese patent application.
Office Action dated Jun. 19, 2020 in a counterpart Chinese patent application.
Office Action dated Apr. 6, 2021 in a counterpart Chinese patent application.

\* cited by examiner

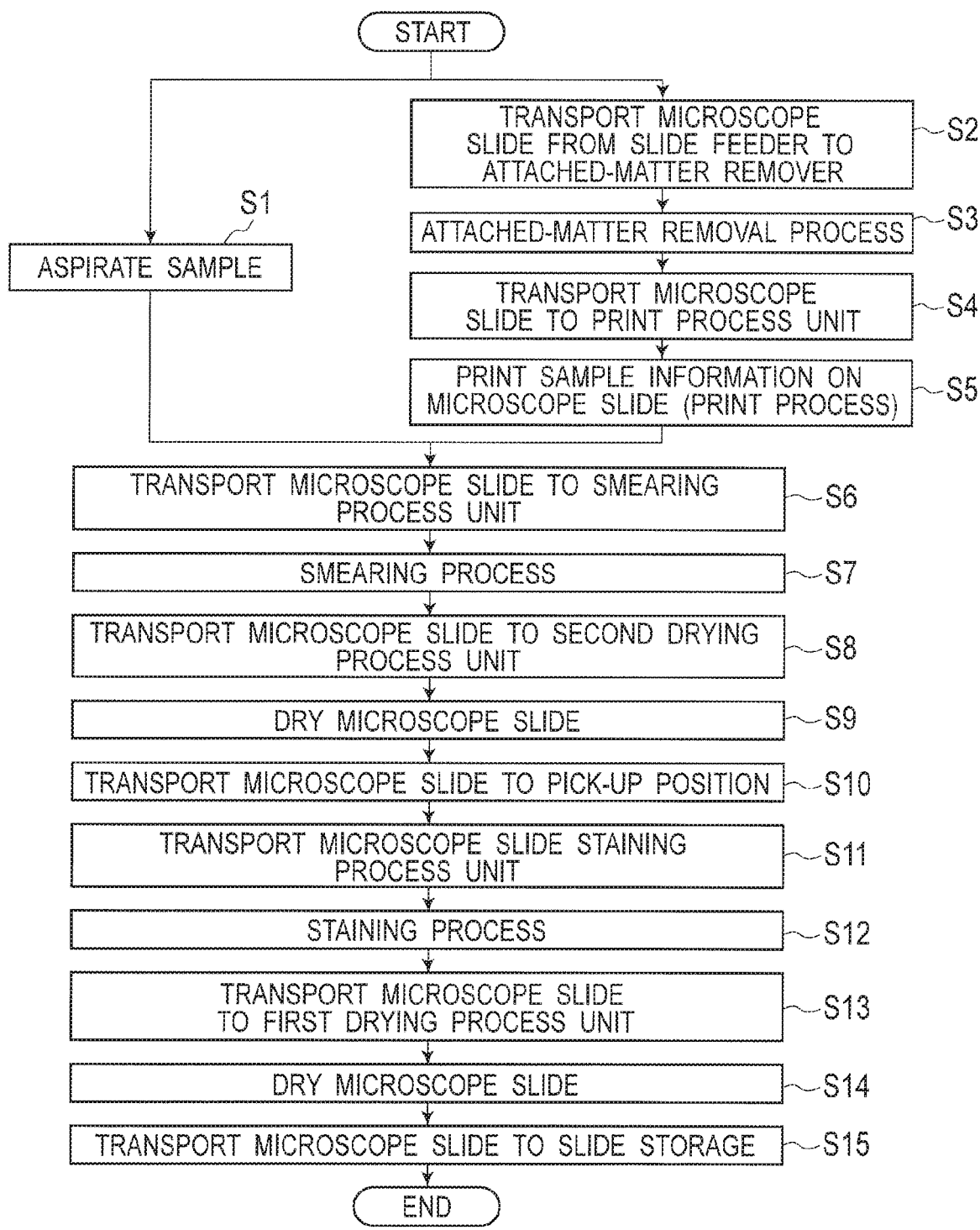

SMEAR PREPARING APPARATUS AND SMEAR PREPARING METHOD

CROSS REFERENCE TO RELATED APPLICATIONS

This application claims priority based on 35 USC 119 from prior Japanese Patent Application No. 2016-105390 filed on May 26, 2016, entitled "SMEAR PREPARING APPARATUS AND SMEAR PREPARING METHOD", the entire contents of which are hereby incorporated herein by reference.

BACKGROUND

This disclosure relates to a smear preparing apparatus and a smear preparing method.

Japanese Patent Application Publication No. 2000-74803 (Patent Literature 1) discloses a smear preparing apparatus including a staining unit that stains a sample smeared on a microscope slide, a slide transfer unit that transfers the microscope slide having the stained sample into a storage tool, and a transport path for transporting the storage tool. The storage tool has a cuboidal outer shape and includes recesses capable of storing microscope slides in a vertical posture. The transport path includes a first path extending in the left-right direction on the near side of the apparatus and a second path extending on a lateral side of the apparatus from the first path toward the far side of the apparatus.

On the first path, storage tools are transported to the second path with the longitudinal direction of the storage tools matched to the left-right direction, in which the first path extends. On the second path, the storage tools received from the first path are moved in the transverse direction of the storage tools toward the far end and the storage tools are then stored. Thus, the storage tools are moved through the first path and the second path with their longitudinal direction matched to the left-right direction of the apparatus. The storage tools are stored one after another from the far side of the second path.

SUMMARY

A smear preparing apparatus according to one or more embodiments includes: a first transporter that transports a storage tool in a first direction, the storage tool capable of holding microscope slides side by side in the first direction; a slide transfer unit that transfers a microscope slide having a stained sample to the storage tool transported by the first transporter; and a second transporter that is adjacent to the first transporter and that transports the storage tool housing the microscope slide transferred by the slide transfer unit, in a second direction opposite to the first direction.

A smear preparing method according to one or more embodiments includes: transporting a storage tool in a first direction, the storage tool capable of holding microscope slides side by side in the first direction; transferring a microscope slide having a stained sample to a transported storage tool; and transporting the storage tool housing a transferred microscope slide in a second direction opposite to the first direction from a position adjacent to a position at which the microscope slide is stored.

BRIEF DESCRIPTION OF DRAWINGS

FIG. 12 is a flowchart illustrating a smear preparing process.

DETAILED DESCRIPTIONS

Figure 1:
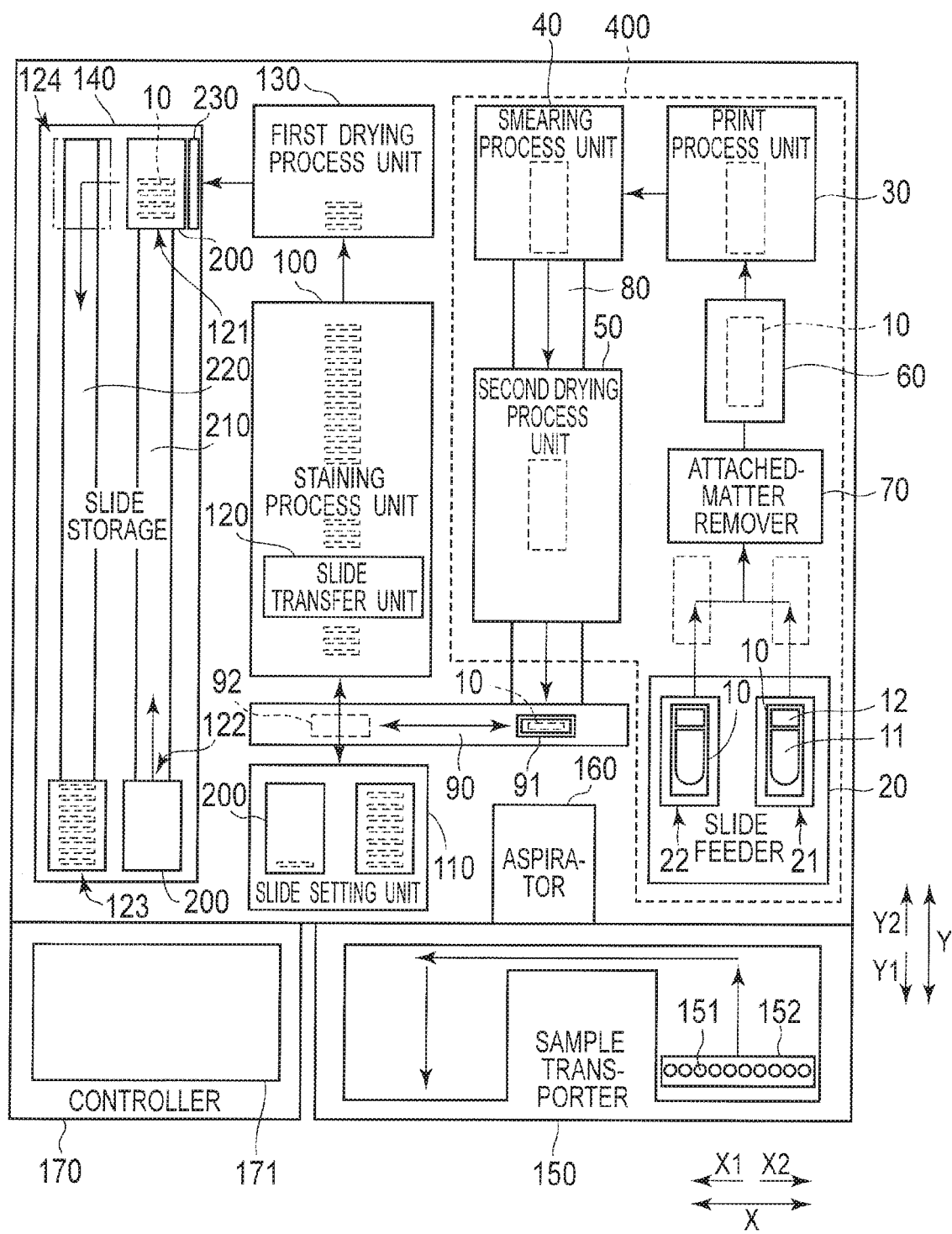
FIG. 1 is a plan view for explaining an example of the configuration of a whole smear preparing apparatus.

Embodiments are explained with reference to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on one or more embodiments. For this reason, specific dimensions and the like should be interpreted with the following descriptions taken into consideration. In addition, the drawings may include parts whose dimensional relationship and ratios are different from one drawing to another.

[Configuration of Whole Smear Preparing Apparatus]

Smear preparing apparatus 400 according to one or more embodiments is generally described with reference to FIG. 1.

Smear preparing apparatus 400 is an apparatus that prepares a slide specimen by performing a sample staining process on microscope slide 10 on which a sample is smeared. The sample is a biological sample collected from a test subject (human subject) and is, for example, blood, urine, cells, or the like.

In the configuration example illustrated in FIG. 1, smear preparing apparatus 400 includes slide feeder 20, print process unit 30, smearing process unit 40, second drying process unit 50, slide transporter 60, attached-matter remover 70, and delivery mechanism 80. In the configuration example of FIG. 1, the smear preparing apparatus 400 further includes slide transporter 90, staining process unit 100, slide setting unit 110, slide transfer unit 120, first drying process unit 130, and slide storage 140.

In the following, two directions perpendicular to each other in a plane parallel to the surface on which smear preparing apparatus 400 is installed (i.e. horizontal plane) are referred to as an X direction and a Y direction, respectively. In the example of FIG. 1, smear preparing apparatus 400 has a quadrangle outer shape extending along the X direction and the Y direction in a plan view. The X direction is defined as the left-right direction of smear preparing apparatus 400, and the Y direction is defined as the front-rear direction of smear preparing apparatus 400. A Y1 direction side is the near side of the apparatus body, and a Y2 direction side is the far side of the apparatus body. Specifically, in this application, the left-right direction, the direction toward the near side, and the direction toward the far side of smear preparing apparatus 400 are defined based on the view of the operator of smear preparing apparatus 400 operating smear preparing apparatus 400 from the front side of smear preparing apparatus 400. Moreover, a vertical direction perpendicular to the horizontal plane is defined as a Z direction.

Microscope slide 10 is, for example, a plate-shaped member having a rectangular shape. Microscope slide 10 has, for example, smearing region 11 to smear a sample and print region 12 to display pieces of information such as sample information. Smearing region 11 is formed, for example, at a center portion in the longitudinal direction in a predetermined range extending in the longitudinal direction. Print region 12 is formed, for example, at one end portion in the longitudinal direction away from smearing region 11. Print region 12 is a portion processed to be printable by coating microscope slide 10 with, for example, a resin material or the like. A sample number, a date, a barcode, a matrix code, and the like can be printed on print region 12.

In the configuration example of FIG. 1, smear preparing apparatus 400 further includes sample transporter 150, aspirator 160, and controller 170.

Sample transporter 150 is disposed in smear preparing apparatus 400 on the nearest side. Sample transporter 150 transports sample container 151 containing a sample to be smeared onto microscope slide 10. Multiple sample containers 151 containing samples can be set in sample transporter 150. Sample transporter 150 transports sample containers 151 thus set to a predetermined load position. Sample transporter 150 transports, for example, rack 152 holding sample containers 151. Aspirator 160 aspirates the liquid sample, such as blood or urine, from each sample container 151 transported to the load position by sample transporter 150. Aspirator 160 feeds the aspirated sample to smearing process unit 40. The configuration may be such that sample transporter 150 is not provided but instead the user directly sets sample containers 151 at the load position.

Slide feeder 20 is capable of holding a microscope slide yet to be processed and feeds microscope slide 10 yet to be processed. Slide feeder 20 can store multiple microscope slides 10. Slide feeder 20 is disposed in smear preparing apparatus 400 on a second direction side which is the near side of the apparatus body (Y1 direction side).

In the configuration example of FIG. 1, slide feeder 20 includes first feeder 21 and second feeder 22. Slide feeder 20 may include one feeder or three or more feeders. Slide feeder 20 can store many unused microscope slides 10 before sample smearing in each of first feeder 21 and second feeder 22. Microscope slides 10 are, for example, stored to lie flat inside first feeder 21 and second feeder 22 with their smearing surfaces facing up.

First feeder 21 and second feeder 22 are disposed side by side in the X direction. Each of first feeder 21 and second feeder 22 can move microscope slides 10 before smearing stored therein in the Y2 direction to feed microscope slides 10 one by one.

Print process unit 30 performs a print process for printing on microscope slide 10. The print process by print process unit 30 is a process of printing pieces of information such as sample information on print region 12 of the surface of microscope slide 10. Print process unit 30 performs the printing on microscope slide 10 held on the upper surface of slide transporter 60. Print process unit 30 performs the print process, for example, with a print unit including a known print head such as that of a thermal printer, an inkjet printer, or the like. In the configuration example of FIG. 1, print process unit 30 is disposed in a first direction (Y2 direction) relative to slide feeder 20.

Smearing process unit 40 performs a smearing process for smearing a sample onto microscope slide 10. The smearing process by smearing process unit 40 is a process of smearing a sample onto smearing region 11 of the surface of microscope slide 10. For the smearing process, it is possible to employ a smearing method using a smearing member such as a spreader slide (so-called wedge method) or other smearing methods. Smearing process unit 40 performs the smearing process with a smearing mechanism designed for the smearing method employed. Smearing process unit 40 smears a sample onto microscope slide 10 held on the upper surface of slide transporter 60. In the configuration example of FIG. 1, smearing process unit 40 is disposed in a third direction (X1 direction) relative to print process unit 30.

Slide transporter 60 is provided to transport microscope slide 10 by moving between slide feeder 20, attached-matter remover 70, print process unit 30, and smearing process unit 40. In other words, slide transporter 60 functions as a transporter common to slide feeder 20, print process unit 30, and smearing process unit 40.

Slide transporter 60 can move horizontally (in the X and Y directions). Slide transporter 60 can, for example, hold one microscope slide 10 on its upper surface and transport it. Slide transporter 60 can receive microscope slide 10 from first feeder 21. Slide transporter 60 can also receive microscope slide 10 from second feeder 22. Slide transporter 60 can transport microscope slide 10 held thereon to a process position in each of attached-matter remover 70, print process unit 30, and smearing process unit 40. Slide transporter 60 transports microscope slide 10 received from slide feeder 20 to attached-matter remover 70, print process unit 30, and smearing process unit 40 in this order. Slide transporter 60 can move microscope slide 10 held thereon in the vertical direction (Z direction). Being held on slide transporter 60, microscope slide 10 undergoes a predetermined process at each of attached-matter remover 70, print process unit 30, and smearing process unit 40.

In the configuration example of FIG. 1, slide transporter 60 transports microscope slide 10 with the longitudinal direction of microscope slide 10 matched to the Y2 direction and the transverse direction of microscope slide 10 matched to the X direction. Slide transporter 60 may not be provided but instead an individual transporter that transports microscope slide 10 may be provided for each of attached-matter remover 70, print process unit 30, and smearing process unit 40.

Attached-matter remover 70 removes attached matters attached to the surface of microscope slide 10. For example, attached-matter remover 70 may be connected to a pressure source not illustrated and blow off matters attached to smearing region 11 and print region 12 of microscope slide 10 by discharging air. The attached matters are, for example, small foreign matters such as glass particles and dust.

In the configuration example of FIG. 1, delivery mechanism 80 delivers microscope slide 10 transported to smearing process unit 40 to second drying process unit 50. Delivery mechanism 80 moves microscope slide 10 transported to smearing process unit 40 in the Y1 direction to position it to a process position in second drying process unit 50. In other words, delivery mechanism 80 transports microscope slide 10 in the second direction (Y1 direction) from smearing process unit 40 to second drying process unit 50.

Second drying process unit 50 performs a drying process on microscope slide 10 having an unstained sample for drying the sample on microscope slide 10 which has undergone the smearing process. Second drying process unit 50 can dry the sample smeared on microscope slide 10 by blowing air. In the configuration example of FIG. 1, second drying process unit 50 is disposed in the second direction (Y1 direction) relative to smearing process unit 40.

In the configuration example of FIG. 1, delivery mechanism 80 is configured to deliver microscope slide 10 delivered to second drying process unit 50 further to slide transporter 90 from second drying process unit 50. Delivery mechanism 80 moves microscope slide 10 transported to second drying process unit 50 in the Y1 direction to pass it to slide transporter 90.

Slide transporter 90 is disposed in the Y1 direction relative to second drying process unit 50 and staining process unit 100 and is provided along the X direction. Slide transporter 90 is configured to transport microscope slide 10 in the X1 direction from second drying process unit 50 to pick-up position 92 between staining process unit 100 and slide setting unit 110. Slide transporter 90 has housing unit 91 that houses microscope slide 10 and can move housing unit 91 in the X direction. Slide transporter 90 receives microscope slide 10 laid substantially parallel to the installation surface into housing unit 91 and transports microscope slide 10 to pick-up position 92 while keeping it upright substantially perpendicularly to the installation surface. Thus, at pick-up position 92, microscope slide 10 is held with its smearing surface stood upright along the vertical direction (Z direction).

Staining process unit 100 can stain the sample smeared on microscope slide 10. Staining process unit 100 is disposed next to second drying process unit 50 in the X1 direction and configured to receive microscope slide 10 transported in the X1 direction from second drying process unit 50. In the configuration example of FIG. 1, staining process unit 100 is provided along the Y direction. Staining process unit 100 includes staining tanks 1 storing staining solution and cleaning tanks storing cleaning liquid. At staining process unit 100, microscope slide 10 after the smearing undergoes a staining process and a cleaning process in the staining tanks and the cleaning tanks.

Slide setting unit 110 is disposed in the second direction (Y1 direction) relative to staining process unit 100 and is configured to hold microscope slides 10 such that microscope slides 10 can be taken in and out. In slide setting unit 110, for example storage tools 200 capable of holding microscope slides 10 are set in a removable manner. Slide setting unit 110 holds microscope slides 10 within storage tools 200 thus set.

Slide transfer unit 120 can transfer microscope slide 10 having the stained sample to storage tool 200 disposed at slide storage position 121. Slide transfer unit 120 can also transfer microscope slide 10 in the first direction (Y2 direction) from slide setting unit 110 to staining process unit 100. In the configuration example of FIG. 1, slide transfer unit 120 can transfer microscope slide 10 between staining process unit 100, slide setting unit 110, and pick-up position 92. Slide transfer unit 120 can, for example, move in each of the X direction, the Y direction, and the Z direction at a height position above staining process unit 100, slide setting unit 110, and pick-up position 92. In this way, slide transfer unit 120 can grip and take out microscope slide 10 disposed at staining process unit 100, slide setting unit 110, or unload position 92 and also transfer microscope slide 10 to staining process unit 100, slide setting unit 110, or pick-up position 92. Here, slide storage position 121 is a position at which microscope slide 10 having the stained sample is transferred to storage tool 200 and is not limited to a fixed position. For example, microscope slide 10 may be transferred to storage tool 200 while storage tool 200 is moved. In that case, slide storage position 121 represents a region that moves in transfer of microscope slide 10 having the stained sample to storage tool 200, and therefore occupies a range.

With the configuration in which slide transfer unit 120 transfers microscope slide 10 between staining process unit 100, slide setting unit 110, and pick-up position 92, smear preparing apparatus 400 can transfer microscope slide 10 on which a sample has been smeared and which have been manually set in slide setting unit 110 by the user, from slide setting unit 110 to staining process unit 100. Besides the operation in the normal mode in which the print process, the smearing process, and the staining process are performed, smear preparing apparatus 400 can operate in a smearing mode in which microscope slide 10 having undergone the print process and the smearing process is sent to slide setting unit 110 without undergoing the staining process. Smear preparing apparatus 400 can also operate in a staining mode in which microscope slide 10 on which a sample has been smeared and which has been manually set in slide setting unit 110 by the user undergoes the staining process by the staining process unit 100 and is sent to slide storage 140.

In the configuration example of FIG. 1, slide transfer unit 120 can transfer microscope slide 10 from staining process unit 100 to first drying process unit 130 and slide storage 140. The transport of microscope slide 10 between staining process unit 100, slide setting unit 110, and pick-up position 92 and the transport of microscope slide 10 from staining process unit 100 to first drying process unit 130 and slide storage 140 may be done by individual slide transfer units.

In the configuration example of FIG. 1, first drying process unit 130 is disposed next to staining process unit 100 in the Y2 direction. First drying process unit 130 receives microscope slide 10 transported in the Y2 direction from staining process unit 100. First drying process unit 130 dries microscope slide 10 having the stained sample by staining process unit 100 by, for example, blowing air. First drying process unit 130 passes microscope slide 10 thus dried to slide storage 140.

Slide storage 140 receives and stores microscope slide 10 that has finished its processes. In the configuration example of FIG. 1, slide storage 140 is disposed next to first drying process unit 130 in the X1 direction, and receives microscope slide 10 transported in the X1 direction from first drying process unit 130.

In slide storage 140, for example storage tools 200 capable of holding microscope slides 10 are set in a removable manner. Slide storage 140 can store and keep microscope slides 10 in storage tools 200 set therein.

In the configuration example of FIG. 1, slide storage 140 includes first transporter 210, second transporter 220, and storage-tool movement mechanism 230.

First transporter 210 is configured to transport, in the first direction (Y2 direction), storage tool 200 capable of holding microscope slides 10 side by side in the first direction. Second transporter 220 is provided adjacently to first transporter 210 and is configured to transport storage tool 200 housing microscope slides 10 transferred by slide transfer unit 120 in the second direction (Y1 direction), which is opposite to the first direction (Y2 direction). In this way, first transporter 210 and second transporter 220 can transport storage tool 200 along the direction of arrangement of microscope slides 10 in storage tool 200. In the case of storage tool 200 capable of storing multiple microscope slides 10, the dimension of storage tool 200 is long in the direction of arrangement of microscope slides 10 and short in the direction perpendicular to the direction of arrangement. Thus, the dimension of first transporter 210 and second transporter 220 in the left-right direction (X direction) can be set based on the dimension of storage tool 200 in its transverse direction. Consequently, the width of first transporter 210 and second transporter 220 can be smaller than a configuration in which storage tool 200 is transported with its longitudinal direction matched to the left-right direction (X direction). Hence, the size of smear preparing apparatus 400 can be reduced accordingly. Note that the provision of second transporter 220 adjacently to first transporter 210 means that second transporter 220 and first transporter 210 may just be provided adjacently to each other and other process units such as print process unit 30, smearing process unit 40, first drying process unit 130, second drying process unit 50, and staining process unit 100 are not provided between the first transporter and the second transporter.

Also, with the configuration in which first transporter 210 transports storage tool 200 in the first direction (Y2 direction), empty storage tool 200 can be set at a position on the second direction side (Y1 direction side) of first transporter 210. With the configuration in which second transporter 220 transports storage tool 200 in the second direction (Y1 direction), storage tool 200 storing microscope slides 10 processed by smear preparing apparatus 400 can be collected from a position on the second direction side (Y1 direction side) of second transporter 220. In this way, the position for performing the operation of setting empty storage tool 200 and the position for performing the operation of collecting storage tool 200 storing microscope slides 10 are arranged adjacently to each other at positions on the second direction side (Y1 direction side). This makes it possible to provide the user with easy access and hence facilitate the operations to be performed by the user.

In the configuration example of FIG. 1, first transporter 210 is provided along the first direction (Y2 direction). In the configuration example of FIG. 1, first transporter 210 extends in the front-rear direction of the apparatus body (Y direction). In the configuration example of FIG. 1, the first direction (Y2 direction) is the direction in which microscope slides 10 are arranged side by side in storage tool 200 and is also the direction toward the far side of the apparatus body. With the first direction of storage tool 200 matched to the direction toward the far side of the apparatus body, first transporter 210 transports storage tool 200 toward the far side to slide storage position 121. Second transporter 220 is provided adjacently to first transporter 210 and extends along the front-rear direction of the apparatus body (Y direction). With the second direction of storage tool 200, which is opposite to the first direction, matched to the direction toward the near side of the apparatus body, second transporter 220 transports storage tool 200 toward the near side. A smear preparing apparatus is often used, for example, as a system in combination with another apparatus such as a sample analyzer. In that case, the smear preparing apparatus and the other apparatus are disposed side by side in the left-right direction (X direction). Then, to make the width of the whole system in the left-right direction small, it is desired to reduce in particular the dimension of the smear preparing apparatus in the left-right direction. In the configuration example of FIG. 1, first transporter 210 and second transporter 220 extend in the front-rear direction of the apparatus body (Y direction) and are adjacent to each other in the left-right direction (X direction). This effectively reduces the dimension of the smear preparing apparatus in the left-right direction.

In the configuration example of FIG. 1, storage-tool movement mechanism 230 is configured to move storage tool 200 from first transporter 210 to second transporter 220. Storage-tool movement mechanism 230 may not be provided but instead first transporter 210 may be capable of moving storage tool 200 to second transporter 220.

First transporter 210 transports storage tool 200 not storing any microscope slide 10 in the first direction (Y2 direction) from storage-tool setting position 122 at which storage tool 200 is disposed toward slide storage position 121, at which slide transfer unit 120 transfers microscope slide 10 having the stained sample. Slide storage position 121 is a position adjacent to the first drying process unit 130 in the third direction (X1 direction). Slide transfer unit 120 moves microscope slide 10 in the X1 direction from first drying process unit 130 and sets microscope slide 10, which has finished its processes, into storage tool 200 at slide storage position 121. With storage-tool movement mechanism 230, slide storage 140 moves storage tool 200 housing microscope slides 10 in the third direction (X1 direction) from slide storage position 121 on first transporter 210 to reception position 124 on second transporter 220. Second transporter 220 transports storage tool 200 in the second direction (Y1 direction) from reception position 124 toward storage-tool collection position 123. Storage-tool setting position 122 and storage-tool collection position 123 are positions lying side by side in the X direction. The user can set empty storage tool 200 at storage-tool setting position 122 and take out storage tool 200 disposed at storage-tool collection position 123.

Note that, in the configuration example of FIG. 1, sample transporter 150 is disposed in the second direction (Y1 direction) relative to first transporter 210 and second transporter 220. First transporter 210 transports storage tool 200 to slide storage position 121 from storage-tool setting position 122, which is disposed at the end of first transporter 210 in the second direction (Y1 direction). Second transporter 220 transports storage tool 200 to storage-tool collection position 123, which is disposed at the end of second transporter 220 in the second direction (Y1 direction). Thus, storage-tool setting position 122 and storage-tool collection position 123 can be disposed side by side near sample transporter 150, which is disposed on the second direction side of the apparatus. Hence, the spots where the user's operations take place can be gathered on the second direction side of the apparatus body. Specifically, the positions for performing the operation of setting sample container 151 or rack 152 into sample transporter 150, the operation of setting empty storage tool 200 at storage-tool setting position 122, and the operation of collecting storage tool 200 storing microscope slides 10 from storage-tool collection position 123 can be gathered on the second direction side of the apparatus body. This facilitates operations to be performed by the user and therefore improves the usability of the apparatus.

Also, In the configuration example of FIG. 1, slide feeder 20 is disposed at a position aligned with storage-tool setting position 122 and storage-tool collection position 123 in the third direction (X direction), which is perpendicular to the first direction (Y2 direction). Thus, slide feeder 20 can be disposed on the second direction side of the apparatus like storage-tool setting position 122 and storage-tool collection position 123. This allows the user to perform the operation of setting microscope slides 10 into slide feeder 20 on the second direction side of the apparatus. Since operations to be performed by the user can be gathered on the second direction side of the apparatus, the usability of the apparatus is improved.

Also, In the configuration example of FIG. 1, slide setting unit 110 is disposed at a position aligned with storage-tool setting position 122 and storage-tool collection position 123 in the third direction (X direction). Thus, slide setting unit 110 can be disposed on the second direction side of the apparatus like storage-tool setting position 122 and storage-tool collection position 123. This allows the user to perform the operation of setting microscope slides into slide setting unit 110 and the operation of taking microscope slides out of slide setting unit 110 on the second direction side of the apparatus. Since operations to be performed by the user can be gathered on the second direction side of the apparatus, the usability of the apparatus is further improved.

In the configuration example of FIG. 1, staining process unit 100 is disposed alongside first transporter 210 at a position on the opposite side of first transporter 210 from second transporter 220. Staining process unit 100 is capable of letting microscope slides 10 be disposed therein side by side along the first direction (Y2 direction) and is configured to cause the staining process of the samples smeared on microscope slides 10 to be completed at the end of staining process unit 100 in the first direction (Y2 direction). In this way, staining process unit 100 can be in an elongated shape along the front-rear direction of the apparatus body (Y direction). Accordingly, the dimension of smear preparing apparatus 400 in the left-right direction can be further reduced. In addition, the position at which the staining process ends in the front-rear direction (Y-direction) and slide storage position 121 on first transporter 210 can be close to each other. Hence, the path of transfer of microscope slide 10 from staining process unit 100 to slide storage position 121 can be short.

In the configuration example of FIG. 1, first drying process unit 130 is disposed at a position in the first direction (Y2 direction) relative to staining process unit 100 and aligned with slide storage position 121 in the third direction (X direction). Slide transfer unit 120 is configured to transfer microscope slide 10 having the stained sample from first drying process unit 130 to storage tool 200 disposed at slide storage position 121. Thus, staining process unit 100 and first drying process unit 130 in alignment with each other in the first direction (Y2 direction) and first transporter 210 can be disposed alongside each other in the left-right direction (X direction). In this way, first drying process unit 130 can be provided without increasing the dimension of smear preparing apparatus 400 in the left-right direction. In addition, the position of first drying process unit 130 and slide storage position 121 can be close to each other in the Y-direction. Hence, the path of transfer of microscope slide 10 from first drying process unit 130 to slide storage position 121 can be minimized.

In the configuration example of FIG. 1, staining process unit 100, first drying process unit 130, and storage tool 200 at slide storage position 121 are all configured to hold microscope slides 10 in the same orientation. Slide transfer unit 120 is configured to transfer microscope slide 10 between staining process unit 100, first drying process unit 130, and storage tool 200 at slide storage position 121. Thus, slide transfer unit 120 does not need to change the orientation of microscope slide 10 when taking microscope slide 10 into or out of staining process unit 100, first drying process unit 130, or storage tool 200 at slide storage position 121. This eliminates the need to additionally provide a mechanism for changing the orientation of microscope slide 10 or the like and thereby allows reduction in size of smear preparing apparatus 400.

Specifically, In the configuration example of FIG. 1, staining process unit 100, first drying process unit 130, and storage tool 200 at slide storage position 121 all hold microscope slides 10 upright with their smearing surfaces extending along the left-right direction (X direction) of the apparatus body. In other words, microscope slides 10 are held with their thickness direction matched to the direction toward the far side of the apparatus body (Y2 direction).

Also, in the configuration example of FIG. 1, slide transporter 60 transports microscope slide 10 in the first direction (Y2 direction) from slide feeder 20 to print process unit 30. Hence, a first transport path for microscope slide 10 is formed along the Y direction. Delivery mechanism 80 transports microscope slide 10 in the second direction (Y1 direction) from smearing process unit 40 to second drying process unit 50. Hence, a second transport path for microscope slide 10 is formed along the Y direction. Slide transfer unit 120 transports microscope slide 10 in the first direction (Y2 direction) between slide setting unit 110, staining process unit 100, and first drying process unit 130. Hence, a third transport path for microscope slide 10 is formed along the Y direction. In FIG. 1, the above configurations provide four transport paths along the Y direction in smear preparing apparatus 400 including the transport path along the Y direction formed by first transporter 210 and second transporter 220 of slide storage 140, and the units of smear preparing apparatus 400 are aligned in four lines along the Y direction. Consequently, the units can be disposed by efficiently utilizing the space in smear preparing apparatus 400 in the front-rear direction (Y direction). Hence, the dimension of smear preparing apparatus 400 in the left-right direction can be effectively reduced.

Controller 170 includes a CPU and a memory not illustrated and controls the operation of each unit of smear preparing apparatus 400. Controller 170 includes output unit 171. Output unit 171 is, for example, a display unit such as a liquid crystal monitor. Note that output unit 171 may be a printer.

With the above configuration, smear preparing apparatus 400 can automatically prepare a smear by performing each of the process of printing on microscope slide 10, the process of smearing a sample, and the process of staining the sample.

(Configuration Example of Slide Storage)

Next, a specific configuration example of slide storage 140 is described with reference to FIG. 2.

Figure 2:
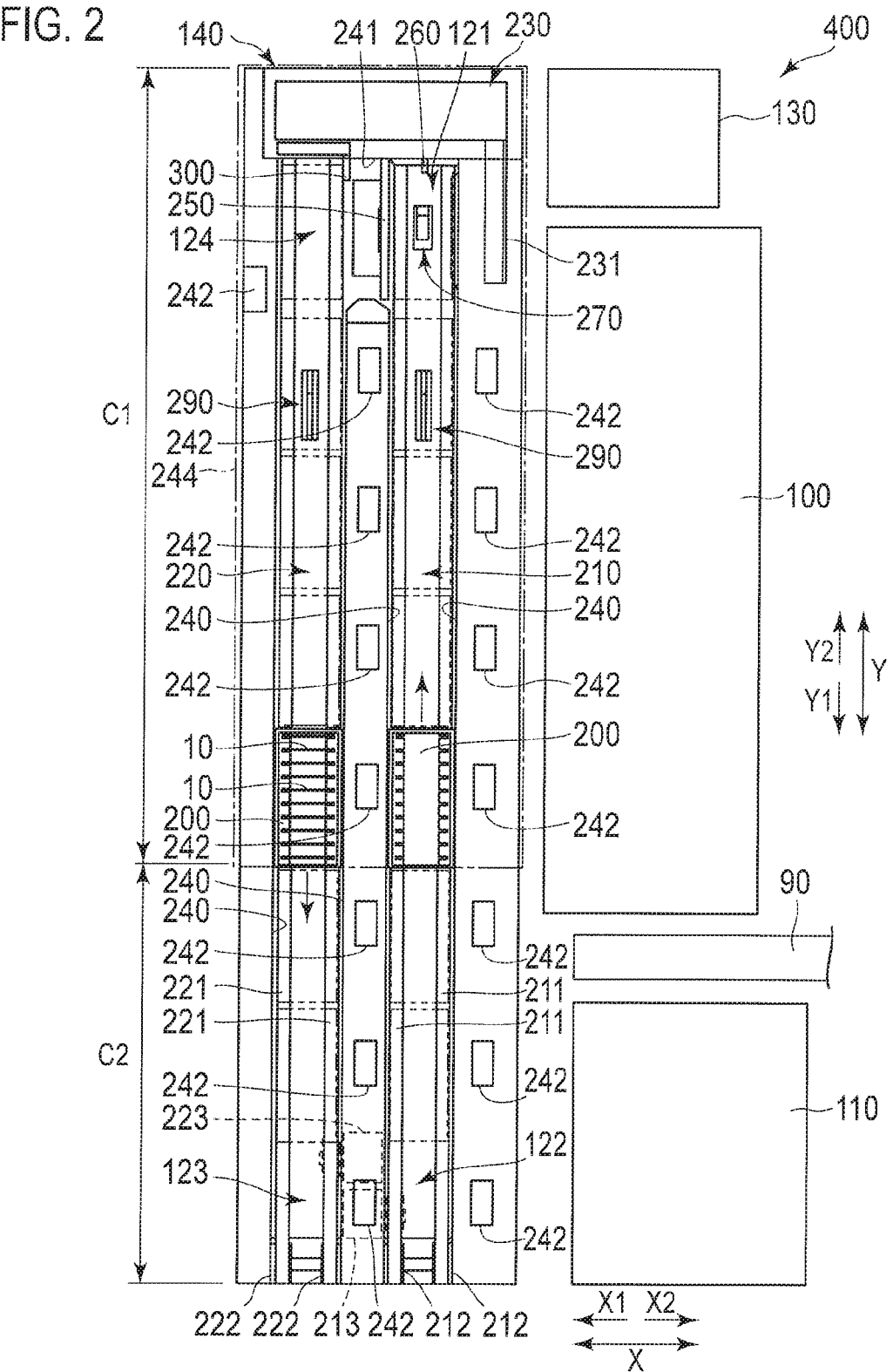
FIG. 2 is a schematic plan view for explaining an example of the configuration of a whole slide storage.

In the configuration example of FIG. 2, each of first transporter 210 and second transporter 220 is formed to extend straight in the Y direction. First transporter 210 and second transporter 220 are disposed side by side in the X direction. Storage-tool setting position 122 is a position at the end of first transporter 210 in the second direction (Y1 direction). Slide storage position 121 is a position at the end of first transporter 210 in the first direction (Y2 direction). Storage-tool collection position 123 is a position at the end of second transporter 220 in the second direction (Y1 direction). Reception position 124 is a position at the end of second transporter 220 in the first direction (Y2 direction). Storage-tool setting position 122, slide storage position 121, storage-tool collection position 123, and reception position 124 are mutually different positions.

Each of first transporter 210 and second transporter 220 is configured as a straight transport path. Storage tools 200 can be set along the first direction (Y2 direction) on each of first transporter 210 and second transporter 220. In the configuration example of FIG. 2, up to eight storage tools 200 can be set on each of first transporter 210 and second transporter 220. The number of storage tools 200 that can be set on each of first transporter 210 and second transporter 220 may be any number.

Sidewall portions 240 are provided on both sides of first transporter 210 in the X direction and on both sides of second transporter 220 in the X direction. Sidewall portions 240 extend in the first direction (Y2 direction). Sidewall portions 240 guide the transport of storage tools 200.

First transporter 210 includes end wall portion 241 disposed behind slide storage position 121 in the first direction (Y2 direction) for positioning of storage tool 200 in the first direction. Thus, at first transporter 210, storage tool 200 can be positioned in the first direction (Y2 direction) by simply transporting storage tool 200 in the first direction until it contacts end wall portion 241.

Figure 3:
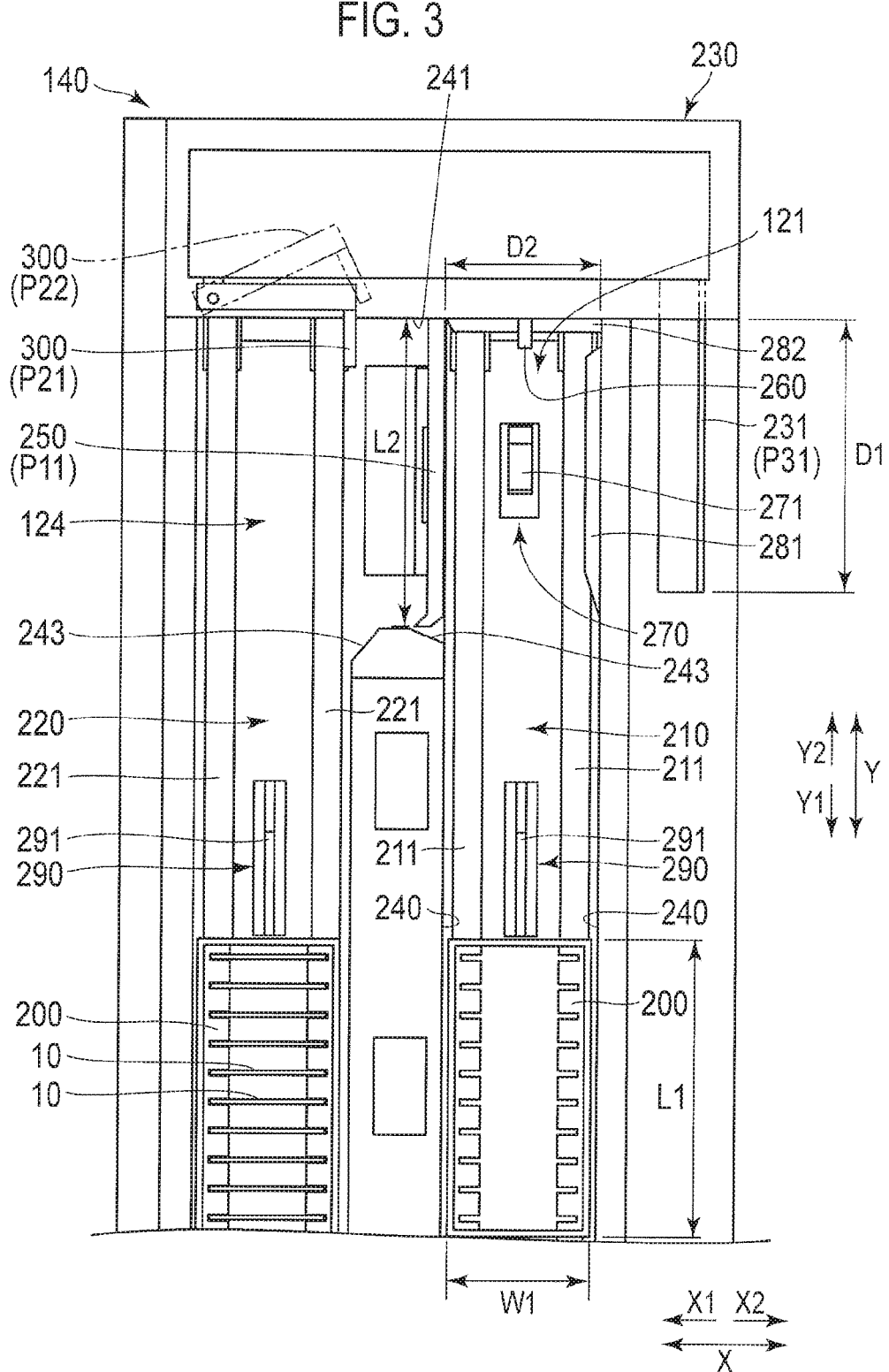
FIG. 3 is a schematic enlarged plan view for explaining the configuration of a part around a slide storage position for a slide storage.

In the configuration example of FIG. 3, end wall portion 241 is provided at the ends of first transporter 210 and second transporter 220 in the first direction (Y2 direction). End wall portion 241 extends in the X direction from first transporter 210 to second transporter 220. In the configuration example of FIG. 3, end wall portion 241 also functions as a guide wall when storage tool 200 is transferred laterally from first transporter 210 to second transporter 220. Note that a wall portion is provided also at the ends of first transporter 210 and second transporter 220 in the second direction (Y1 direction).

First transporter 210 and second transporter 220 transport storage tools 200 with, for example, a belt transport mechanism. In the configuration example of FIG. 2, each of first transporter 210 and second transporter 220 includes a set of two transport belts 211 or 221. The sets of two transport belts 211 and 221 are each disposed on both sides of the corresponding transport path in the X direction and laid on sets of pulleys 212 or 222 provided at both ends in the Y direction. First transporter 210 includes transport motor 213 that drives transport belt 211, and second transporter 220 includes transport motor 223 that drives transport belt 221.

First transporter 210 and second transporter 220 can check the presence of storage tool 200 at each of eight setting positions. Storage-tool sensors 242 are provided on the X2 direction sides of first transporter 210 and second transporter 220. On each side, seven storage-tool sensors 242 are disposed at predetermined intervals in the Y direction at positions corresponding to seven setting positions excluding slide storage position 121 or reception position 124. Contact detector 260 to be described later detects storage tool 200 at slide storage position 121. For reception position 124, storage-tool sensor 242 is disposed on the X1 side of second transporter 220. In this way, it is possible to figure out where on first transporter 210 and second transporter 220 storage tools 200 are present. Storage-tool sensors 242 are, for example, optical sensors.

In the configuration example of FIG. 2, smear preparing apparatus 400 includes cover 244 (see the chain line) provided over first transporter 210 and second transporter 220 and configured to cover slide storage position 121 but expose at least storage-tool setting position 122 on first transporter 210 and storage-tool collection position 123 on second transporter 220 to the outside. Slide storage 140 is partially covered by cover 244 at its first direction side (Y2 direction side). For example, region C1 on the first direction side having the size of five storage tools is covered by cover 244, while region C2 on the second direction side (Y1 direction side) having the size of three storage tools is not covered by cover 244 but is exposed to the outside. At region C2, the user can set storage tool 200 onto first transporter 210 and collect storage tool 200 from second transporter 220. This makes it possible to provide the user with easy access to storage-tool setting position 122 for the operation of setting empty storage tool 200 and provide the user with easy access to storage-tool collection position 123 for the operation of collecting storage tool 200, and also cover slide storage position 121, at which microscope slides 10 are set into storage tool 200, and thereby prevent interference between microscope slides 10 that are being transferred and the user's hand or other obstacles.

In the configuration example of FIG. 2, when storage tools 200 are detected at any of the positions on first transporter 210, controller 170 actuates first transporter 210 in the first direction (Y2 direction) such that storage tools 200 move over to the far side. Storage tools 200 are transported such that they are positioned one after another from the far side (Y2 direction side) of first transporter 210. When storage tools 200 are detected at any of the positions on second transporter 220, controller 170 actuates second transporter 220 in the second direction (Y1 direction) such that storage tools 200 move over to the second direction side. Storage tools 200 are transported such that they are positioned one after another from the second direction side (Y2 direction side) of second transporter 220.

FIG. 3 illustrates an enlarged view of a part around slide storage position 121. Storage-tool movement mechanism 230 is provided at the end of slide storage 140 in the first direction (Y2 direction). In the configuration example of FIG. 3, storage-tool movement mechanism 230 is configured to move storage tool 200 in the third direction (X1 direction), which is perpendicular to the first direction (Y2 direction), from slide storage position 121 on first transporter 210 to reception position 124 on second transporter 220 with the longitudinal direction of storage tool 200 matched to the first direction. In this way, storage tool 200 can be passed from first transporter 210 to second transporter 220 through the shortest path. Thus, the size of storage-tool movement mechanism 230 can be reduced and therefore the size of smear preparing apparatus 400 can be reduced.

Storage-tool movement mechanism 230 includes arm member 231 that moves in contact with storage tool 200 to move it in the third direction (X1 direction) from first transporter 210 to second transporter 220. Arm member 231 is provided to project straight in the Y1 direction from end wall portion 241 by projection length D1. For length L1 of storage tool 200 in its longitudinal direction, projection length D1, for example, satisfies L1>D1>(L1/2). Note that storage tool 200 has length W1 in its transverse direction and satisfies L1>W1.

Storage-tool movement mechanism 230 moves arm member 231 in the X1 direction to push the side surface of storage tool 200 at slide storage position 121 and transfer storage tool 200 laterally to reception position 124.

In the configuration example of FIG. 3, slide storage 140 is provided with partition member 250 disposed at slide storage position 121 between first transporter 210 and second transporter 220. Partition member 250 can move between first position P11 (see FIG. 7) for restricting movement of storage tool 200 in the third direction (X1 direction) and second position P12 (see FIG. 8) for permitting movement of storage tool 200 in the third direction (X1 direction). Thus, partition member 250 at first position P11 can suppress displacement of storage tool 200 in the third direction (X1 direction) when storage tool 200 is transported to slide storage position 121 and when microscope slide 10 is set into storage tool 200 at slide storage position 121. Moreover, although partition member 250 is provided, partition member 250 does not block the lateral transfer of storage tool 200 from first transporter 210 to second transporter 220 by being moved to second position P12.

In the configuration example of FIG. 3, partition member 250 is disposed at first position P11 while slide transfer unit 120 transfers microscope slides 10 having the stained sample into storage tool 200 disposed at slide storage position 121. Partition member 250 is disposed at second position P12 when storage tool 200 storing microscope slides 10 having the stained sample is moved from first transporter 210 toward second transporter 220. In this way, partition member 250 do not block movement of storage tool 200 from first transporter 210 to second transporter 220, and partition member 250 can prevent movement of storage tool 200 toward second transporter 220 while microscope slide 10 having the stained sample is stored into storage tool 200.

In the configuration example of FIG. 3, partition member 250 is formed in a wall shape or a plate shape so as to separate first transporter 210 and second transporter 220 from each other. In the configuration example of FIG. 3, at first position P11, partition member 250 is disposed substantially straight along the first direction (Y2 direction) alongside sidewall portion 240 of first transporter 210 on the second transporter 220 side (X1 direction side). In this way, partition member 250 at first position P11 can function as part of sidewall portion 240. In other words, partition member 250 can function as a guide wall when first transporter 210 transports storage tool 200 in the first direction (Y2 direction) to slide storage position 121. This allows stable transport of storage tool 200. Partition member 250 may be, for example, a bar-shaped member or a grid member obtained by combining bar-shaped members, which is disposed between first transporter 210 and second transporter 220.

Partition member 250 at first position P11 is disposed to be spaced from sidewall portion 240 on the X2 direction side by distance D2 in the X direction. Distance D2 is slightly greater than length W1 of storage tool 200 in its transverse direction. Distance D2 is set such that (D2-W1) is less than the allowable error of the X-direction position of storage tool 200 at slide storage position 121. This eliminates the need for X-direction positioning of storage tool 200 transported to slide storage position 121 such as bringing storage tool 200 into contact with a positioning portion.

Partition member 250 is provided in such a way as to project in the Y1 direction from end wall portion 241. Projection length L2 of partition member 250 is equal to or slightly greater than length L1 of the longitudinal side of storage tool 200. As described later, when partition member 250 is at second position P12, a path with length L2 in the Y direction through which one storage tool 200 can pass is formed between sidewall portion 240 and end wall portion 241. Length L2 is greater than distance D2.

In the configuration example of FIG. 3, sidewall portions 240 between first transporter 210 and second transporter 220 are provided with guide wall portion 243 at a position between them and partition member 250, guide wall portion 243 including corners chamfered to be slanted in a plan view. Guide wall portion 243 guides storage tool 200 moved in the third direction (X1 direction) from slide storage position 121 such that storage tool 200 moves in the third direction without being caught on sidewall portion 240. Moreover, guide wall portion 243 guides storage tool 200 moved in the second direction (Y1 direction) from reception position 124 such that storage tool 200 moves in the second direction without being caught on sidewall portion 240.

In the configuration example of FIG. 3, first transporter 210 includes contact detector 260, which detects contact between storage tool 200 and end wall portion 241. Contact detector 260 is provided on end wall portion 241. In this way, it is possible to detect when storage tool 200 is positioned at slide storage position 121, and thus to more properly set microscope slide 10 into storage tool 200 at slide storage position 121. Contact detector 260 is formed of, for example, a contact-type sensor.

In the configuration example of FIG. 3, first transporter 210 further includes urging mechanism 270 that urges storage tool 200 disposed at slide storage position 121 against end wall portion 241. In this way, storage tool 200 can remain positioned at slide storage position 121. In addition, the urging force can suppress wobble of storage tool 200 even if microscope slide 10 contacts storage tool 200 when slide transfer unit 120 stores microscope slide 10 into storage tool 200. Hence, microscope slide 10 can be stably stored into storage tool 200.

In the configuration example of FIG. 3, first engagement portion 281 extending in the first direction (Y2 direction) and second engagement portion 282 extending in the third direction (X1 direction) are provided at slide storage position 121. First engagement portion 281 and second engagement portion 282 are described later.

In the configuration example of FIG. 3, slide storage 140 is provided with stopper mechanisms 290. Stopper mechanisms 290 are configured to restrict movement, in the first direction (Y2 direction), of storage tool 200 present adjacent to slide storage position 121 on first transporter 210 in the second direction (Y1 direction) and of storage tool 200 present adjacent to reception position 124 on second transporter 220 in the second direction. Specifically, the first positions from the end in the Y2 direction are slide storage position 121 and reception position 124, and stopper mechanisms 290 are provided at the second setting positions for storage tools 200 from the end in the Y2 direction. Stopper mechanisms 290 prevent storage tools 200 at the second setting positions from being pushed toward storage tools 200 at slide storage position 121 and reception position 124. Consequently, even in the case where multiple storage tools 200 are set in each of the transport paths, storage tool 200 that is being transferred laterally from slide storage position 121 to reception position 124 is prevented from contacting adjacent storage tool 200, so that the lateral transfer is not blocked.

In the configuration example of FIG. 3, second transporter 220 further includes movement restriction member 300 disposed at the reception position 124 between second transporter 220 and partition member 250. Movement restriction member 300 can move to third position P21 for restricting movement of storage tool 200 in the third direction (X1 direction) and fourth position P22 (see the two-dot chain line) for permitting movement of storage tool 200 in the third direction. Thus, with movement restriction member 300 disposed at third position P21, storage tool 200 laterally transferred to reception position 124 can be prevented from moving toward first transporter 210. In addition, although movement restriction member 300 is provided, movement restriction member 300 does not block lateral transfer of storage tool 200 from first transporter 210 to second transporter 220 by being moved to fourth position P22.

(Configurations of Storage Tool and Engagement Portions)

A configuration example of storage tool 200, first engagement portion 281, and second engagement portion 282 is described with reference to FIG. 4.

Figure 4:
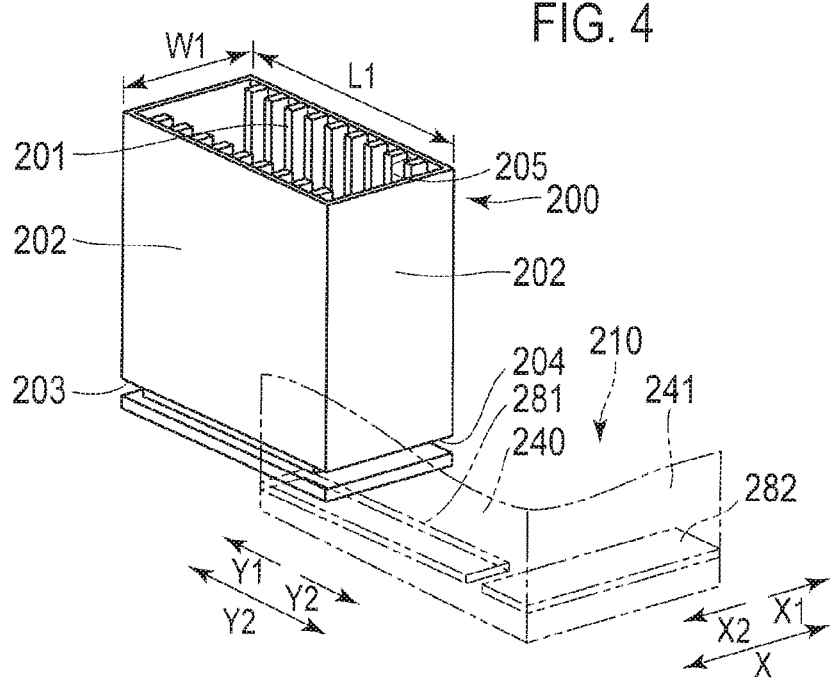
FIG. 4 is a perspective view illustrating a configuration example of a storage tool for microscope slides.

In the configuration example illustrated in FIG. 4, storage tool 200 can store microscope slide 10 upright through an opening provided at the top. Storage tool 200 has a box shape opened at the top and is formed in a substantially cuboidal shape. Storage tool 200 can store multiple microscope slides 10. In the configuration example of FIG. 4, storage tool 200 is configured to hold microscope slides 10 side by side in the first direction. Storage tool 200 can hold microscope slides 10 side by side with their thickness direction matched to the first direction. In the configuration example of FIG. 4, storage tool 200 has a rectangular shape in a plan view, and the first direction is the longitudinal direction of storage tool 200 in the plan view. The third direction (X direction) is the transverse direction of storage tool 200 in the plan view. Storage tool 200 can hold each microscope slide 10 with its shorter edges extending along the transverse direction of storage tool 200. In this way, it is possible to suppress increase in the dimension of storage tool 200 in the transverse direction even in a case where a sufficient number of microscope slides 10 can be stored in single storage tool 200. Hence, with the configuration in which storage tool 200 is transported with the longitudinal direction of storage tool 200 matched to the first direction (Y2 direction), or the direction toward the far side, a sufficient number of microscope slides 10 can be stored and, at the same time, the dimension of the apparatus in the left-right direction be reduced.

Plate-shaped partitions 201 protrude inward in the transverse direction from both inner side surfaces of storage tool 200 in transverse direction. Partitions 201 are arranged at equal intervals in the longitudinal direction. One microscope slide 10 is inserted into the space between these partitions 201. Inserted microscope slide 10 is supported at both end portions thereof in the left-right direction by partitions 201 and is held in such a posture as to extend in the vertical direction (that is, microscope slide 10 is held upright). In this way, storage tool 200 can store microscope slides 10 side by side in the longitudinal direction.

In the configuration example of FIG. 4, storage tool 200 has first engagement groove 203 extending in side surface 202 in the longitudinal direction. First transporter 210 includes first engagement portion 281 (see FIG. 3), which engages with first engagement groove 203 in storage tool 200 transported to slide storage position 121. Thus, at slide storage position 121, the engagement between first engagement portion 281 and first engagement groove 203 can prevent storage tool 200 from tilting and falling.

First engagement groove 203 is formed at a position near the lower end of storage tool 200. First engagement portion 281 is a plate-shaped member formed to protrude from sidewall portion 240 of first transporter 210 on the X2 direction side and extends horizontally along the first direction (Y2 direction). First engagement portion 281 is disposed at the same height position as first engagement groove 203. Thus, as storage tool 200 is transported, first engagement portion 281 enters first engagement groove 203, so that they engage with each other.

In the configuration example of FIG. 4, storage tool 200 has second engagement groove 204 which extends in the transverse direction in side surface 202. First transporter 210 includes second engagement portion 282 (see FIG. 3), which engages with second engagement groove 204 in storage tool 200 transported to slide storage position 121. Thus, at slide storage position 121, the engagement between second engagement portion 282 and second engagement groove 204 can prevent storage tool 200 from tilting and falling.

Second engagement groove 204 is formed at a position near the lower end of storage tool 200. Second engagement portion 282 is a plate-shaped member formed to protrude from end wall portion 241 of first transporter 210 and extends horizontally along the third direction (X1 direction). Second engagement portion 282 is disposed at the same height position as second engagement groove 204. Thus, as storage tool 200 is transported, second engagement portion 282 enters second engagement groove 204, so that they engage with each other.

In the configuration example of FIG. 4, first engagement groove 203 and second engagement groove 204 are connected to each other to define a single groove formed around storage tool 200.

Figure 8:
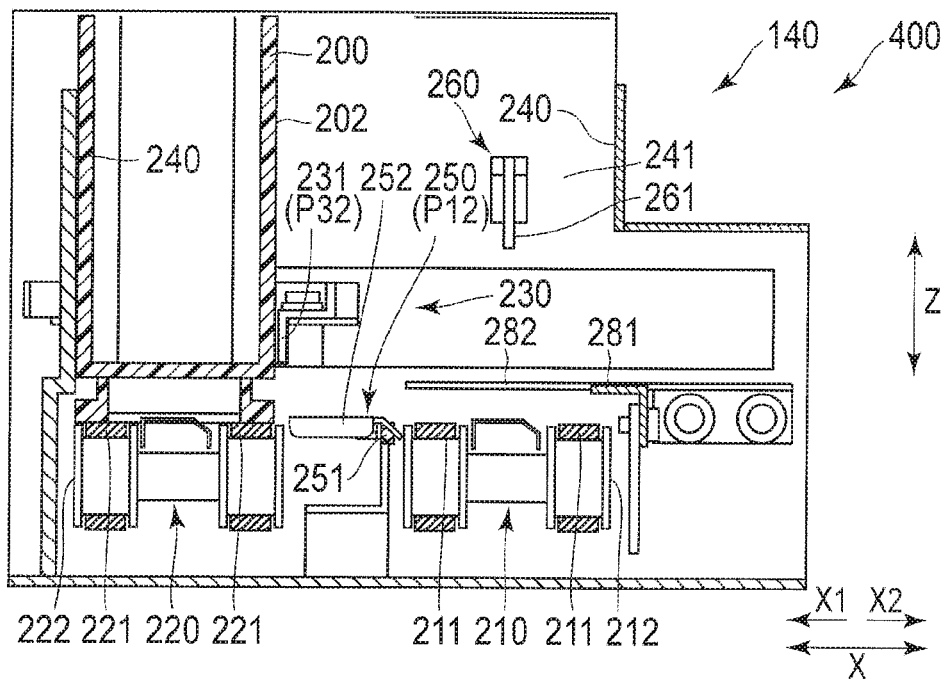
FIG. 8 is a schematic cross-sectional view of the slide storage taken along the third direction illustrating a state where the storage tool is disposed at a reception position.

Also, first engagement portion 281 and second engagement portion 282 are disposed below arm member 231 (see FIG. 8). Thus, even if arm member 231 tilts storage tool 200 in a way that might make storage tool 200 fall in the third direction (X1 direction), storage tool 200 can be more reliably prevented from falling by the engagement of first engagement portion 281 and second engagement portion 282 with the lower portion of storage tool 200.

(Configuration Example of Contact Detector, Urging Mechanism, and Stopper Mechanisms)

A configuration example of contact detector 260, urging mechanism 270, and stopper mechanisms 290 is described with reference to FIG. 5.

Figure 5:
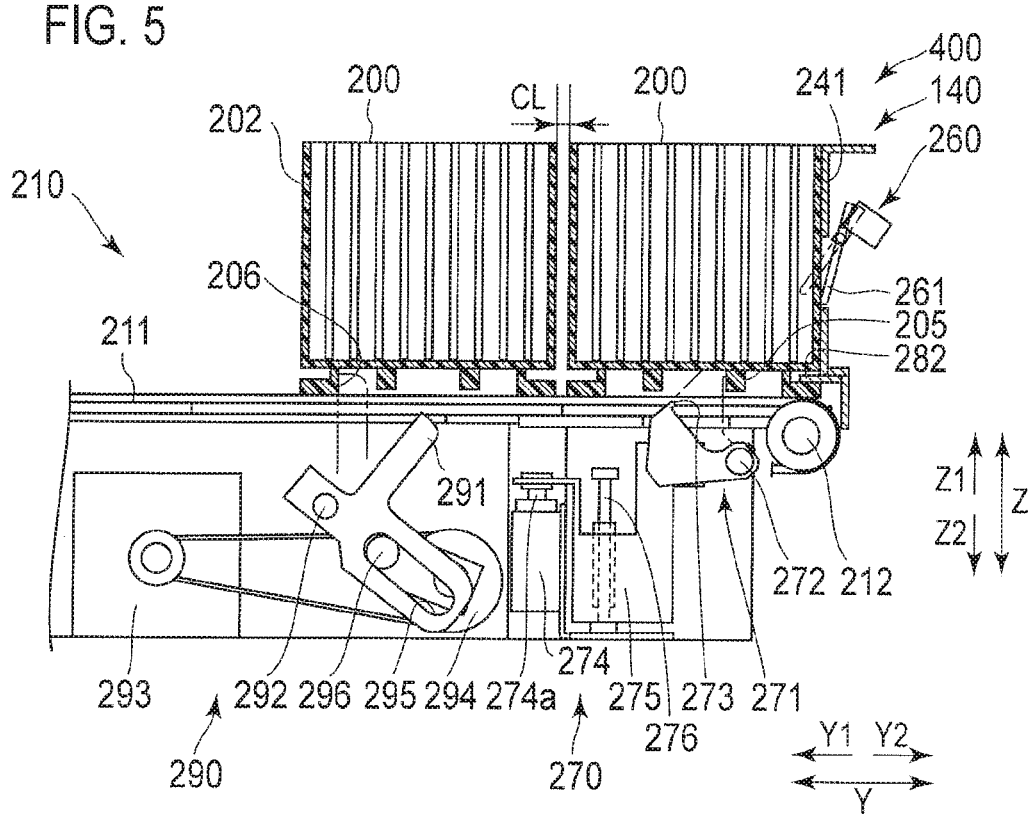
FIG. 5 is a schematic cross-sectional view of a first transporter around the slide storage position taken along a first direction.

In the configuration example of FIG. 5, contact detector 260 is disposed on the Y2 direction side of end wall portion 241 and has detection piece 261 disposed to project in the Y1 direction from an opening portion in end wall portion 241. Detection piece 261 can pivot about an axis extending along the X direction. Contact detector 260 detects contact between storage tool 200 and end wall portion 241 when side surface 202 of storage tool 200 comes into contact with detection piece 261 and pushes detection piece 261 into end wall portion 241.

In the configuration example of FIG. 5, urging mechanism 270 is disposed at a position underneath first transporter 210. Urging mechanism 270 has push member 271 that can move between a position to which push member 271 moves upward (Z1 direction) above first transporter 210 to urge storage tool 200 and a position to which push member 271 moves downward (Z2 direction) below first transporter 210 to retract. In this way, the space in slide storage 140 in the left-right direction can be smaller than when, for example, urging mechanism 270 is disposed by first transporter 210 in left-right direction (X direction). Consequently, although urging mechanism 270 is provided, the dimension of slide storage 140 in the left-right direction can be reduced. Moreover, since push member 271 can urge a lower portion of storage tool 200, storage tool 200 can be stably held at slide storage position 121.

In the configuration example of FIG. 5, push member 271 has a substantially L-shape, and one end side is pivotally supported on pivot shaft 272 while contact portion 273 is provided on the other end side. Urging mechanism 270 further includes actuator 274, link member 275, and guide 276 for moving push member 271. Actuator 274 may be, for example, a motor, a linear motor, a solenoid, an air cylinder, or the like. In FIG. 5, actuator 274 constructed as an air cylinder is provided.

Link member 275 is mounted at one end to rod 274a of actuator 274 and mounted at the other end to push member 271. Thus, with extension or retraction of rod 274a of actuator 274, link member 275 moves upward or downward and, with the movement of link member 275, push member 271 pivots to the urging position or the retract position. Guide 276 is provided along the vertical direction (Z direction) and engages with link member 275 to guide the vertical movement of link member 275.

When positive pressure is fed to actuator 274, rod 274a extends in the Z1 direction, so that push member 271 pivots about pivot shaft 272 and projects from the upper surface of first transporter 210 through an opening portion in first transporter 210. With the pivoting movement, contact portion 273 of push member 271 comes into contact with rib 205 provided on the bottom surface of storage tool 200 and thereby urges storage tool 200 in the first direction (Y2 direction)(see the two-dot chain line). The urging force continues to be applied while the positive pressure is fed to actuator 274. When rod 274a of actuator 274 is pulled back, push member 271 pivots and retracts downward (Z2 direction) below the upper surface of first transporter 210. Urging mechanism 270 starts the urging when contact detector 260 detects empty storage tool 200 transported to slide storage position 121, and maintains the urging force while microscope slide 10 is stored into storage tool 200. Urging mechanism 270 retracts push member 271 during the transport of storage tool 200 toward slide storage position 121 and the lateral transfer of storage tool 200 from slide storage position 121.

In the configuration example of FIG. 5, stopper mechanism 290 is disposed at a position underneath first transporter 210. Stopper mechanism 290 has lock member 291 that can move between a restriction position to which lock member 291 moves upward above first transporter 210 to restrict movement of storage tool 200 and a retract position to which lock member 291 moves downward below first transporter 210 to retract. Lock member 291 moves from the retract position to the restriction position (see the two-dot chain line) by pivoting about pivot shaft 292 in the Y1 direction. At the restriction position, lock member 291 is in contact with the inner side surface of recess 206 formed at the bottom surface of storage tool 200 to restrict movement of storage tool 200 in the first direction (Y2 direction). In the state where lock member 291 is in contact with storage tool 200, lock member 291 prevents movement of storage tool 200 in the Y2 direction even if transport belt 211 are driven in the Y2 direction. The restriction position is set at a predetermined position that leaves predetermined clearance CL in the Y direction between storage tool 200 with which lock member 291 is in contact and first storage tool 200 which is disposed at slide storage position 121. Since lock member 291 pivots in the Y1 direction, lock member 291 moves second storage tool 200 by predetermined clearance CL in the Y1 direction even when second storage tool 200 is in contact with storage tool 200 disposed at slide storage position 121.

The configuration for pivoting lock member 291 is not particularly limited. In the configuration example of FIG. 5, stopper mechanism 290 includes actuator 293 and pivot member 294 that pivots lock member 291. Actuator 293 is constructed as a motor. Pivot member 294 is constructed as a cam mechanism including a pulley and actuation shaft 296 inserted in elongated hole 295 in lock member 291. When actuator 293 pivots pivot member 294, actuation shaft 296 moves inside elongated hole 295, thereby pivoting lock member 291 about pivot shaft 292. Note that lock member 291 is provided to each of first transporter 210 and second transporter 220 (see FIG. 3) and lock members 291 are linked so as to pivot about common pivot shaft 292. Thus, stopper mechanisms 290 of first transporter 210 and second transporter 220 operate in conjunction with each other by using common actuator 293.

(Configuration Example of Storage-tool movement mechanism, Partition Member, and Movement Restriction Member)

Figure 6A:
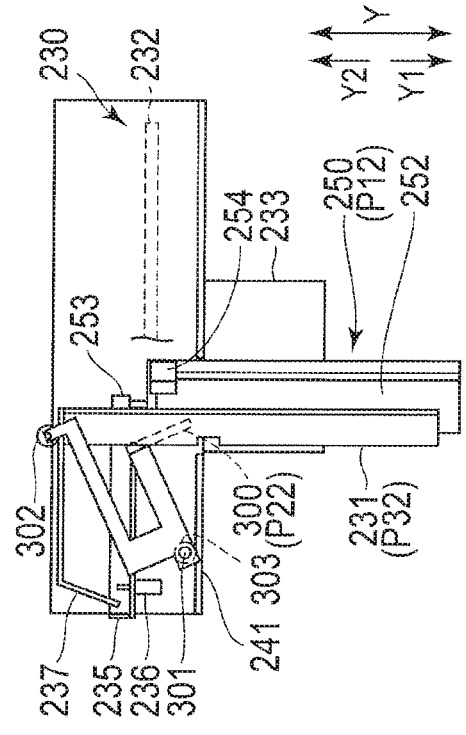
FIGS. 6A and 6B are a plan view and a front view of a storage-tool movement mechanism before lateral transfer, respectively.
Figure 6B:
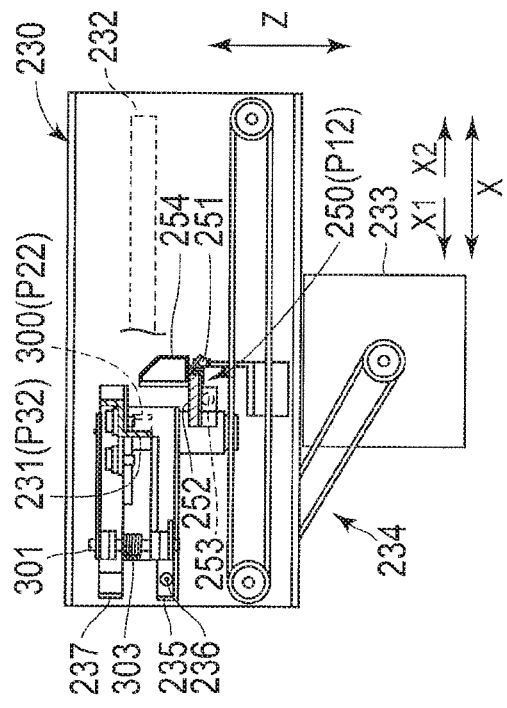
Figure 6C:
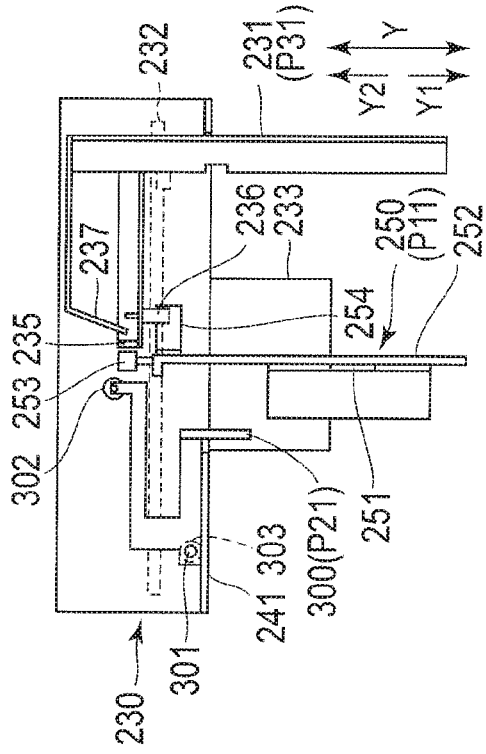
FIGS. 6C and 6D are a plan view and a front view of the storage-tool movement mechanism after the lateral transfer, respectively.
Figure 6D:
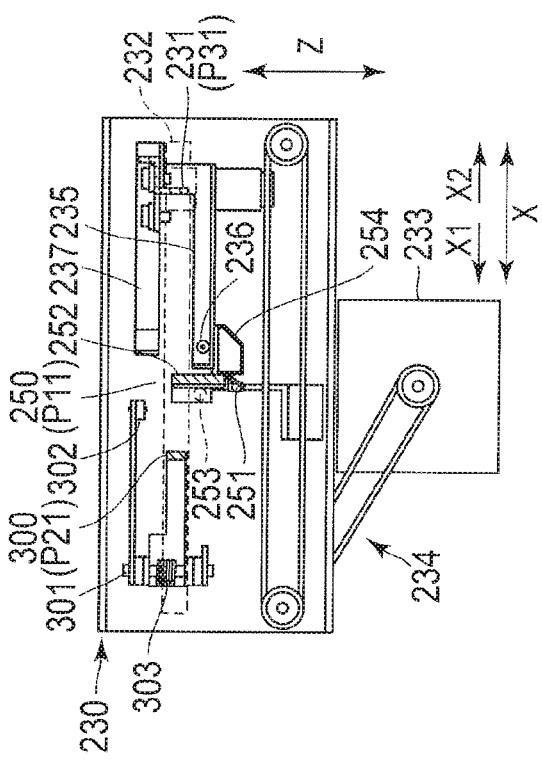

A configuration example of storage-tool movement mechanism 230, partition member 250, and movement restriction member 300 is described with reference to FIGS. 6A to 6D. FIGS. 6A and 6B are a plan view and a front view (a view seen in the direction of arrow Y2) before a lateral transfer operation, and FIGS. 6C and 6D are a plan view and a front view (a view seen in the direction of arrow Y2) after the lateral transfer operation. In FIGS. 6B and 6D, arm member 231, partition member 250, and movement restriction member 300 are illustrated with hatching for convenience.

In the configuration example of FIG. 6B, storage-tool movement mechanism 230 includes arm member 231, guide 232, and drive source 233. Arm member 231 is supported by guide 232, which extends in the X direction, so as to be capable of moving straight in the X direction. Drive source 233 is, for example, constructed as a motor such as a stepping motor or a servomotor. Drive source 233 and arm member 231 are linked to each other by transmission mechanism 234 constructed as a belt-pulley mechanism.

Thus, storage-tool movement mechanism 230 moves arm member 231 in the X direction between standby position P31 (see FIG. 6A) and transfer position P32 (see FIG. 6C) with drive source 233. Standby position P31 is a position on the opposite side (X2 direction side) of slide storage position 121 from second transporter 220. Transfer position P32 is a position at which the side surface of storage tool 200 disposed at reception position 124 and arm member 231 are in contact with each other. Then, by moving arm member 231 in the third direction (X1 direction) from standby position P31 to transfer position P32, storage-tool movement mechanism 230 transfers storage tool 200 at slide storage position 121 laterally in the third direction (X1 direction) to reception position 124.

In the configuration example of FIGS. 6A to 6D, partition member 250 is configured to pivot between first position P11 (see FIG. 6B), at which partition member 250 is stood upright to block passage between first transporter 210 and second transporter 220, and second position P12 (see FIG. 6D), at which partition member 250 is laid to permit passage between first transporter 210 and second transporter 220. Thus, partition member 250, capable of moving between first position P11 for restricting movement of storage tool 200 in the third direction and second position P12 for permitting movement of storage tool 200 in the third direction, can be easily obtained with a simple configuration only requiring pivoting partition member 250.

In FIGS. 6A to 6D, partition member 250 is configured to pivot approximately 90 degrees about pivot shaft 251 extending in Y-direction. Specifically, at first position P11, surface 252 of partition member 250 on the storage tool 200 side is substantially perpendicular to the upper surface of first transporter 210. At first position P11, surface 252 functions as part of sidewall portion 240. At second position P12, surface 252 of partition member 250 on the storage tool 200 side is substantially parallel to the upper surface of first transporter 210. At second position P12, surface 252 functions as a floor surface when storage tool 200 is laterally transferred. Pivot shaft 251 is disposed at the lower end of partition member 250 at first position P11, at which partition member 250 is stood upright, and pivotally supports partition member 250.

In the configuration example of FIGS. 6A to 6D, partition member 250 is configured to pivot in the third direction (X1 direction) from first position P11 to second position P12 with movement of arm member 231. Arm member 231 and partition member 250 are configured to move in conjunction with each other by using common drive source 233. In this way, the number of components can be smaller than when arm member 231 and partition member 250 are driven by individual drive sources. Hence, the configuration of the apparatus can be simpler and the size of slide storage 140 can be smaller accordingly.

Specifically, as illustrated in FIG. 6A, arm member 231 is provided with contact portion 235 extending in the X direction. Partition member 250 is provided, at its end in the Y2 direction, with contact portion 253 disposed to be aligned with contact portion 235 in the X direction. As arm member 231 at standby position P31 is moved in the third direction (X1 direction) by drive source 233, contact portion 253 of partition member 250 at first position P11 and contact portion 235 come into contact with each other, so that contact portion 253 is pushed in the third direction (X1 direction). Consequently, partition member 250 pivots about pivot shaft 251 to fall to second position P12. When partition member 250 falls, contact portion 253 moves away from contact portion 235 to a position below it (see FIG. 6D). Thus, after partition member 250 falls, arm member 231 still continues to move until reaching transfer position P32.

Also, as illustrated in FIG. 6D, partition member 250 is provided with contact portion 254 that projects upward in the state where partition member 250 is located at second position P12. When arm member 231 moves backward in the X2 direction from transfer position P32 toward standby position P31, member 236 provided on contact portion 235 comes into contact with contact portion 254 and pushes down contact portion 254 in the X2 direction with the movement in the X2 direction. Consequently, partition member 250 pivots about pivot shaft 251 to rise to first position P11. When partition member 250 rises, contact portion 254 moves away from member 236 to a position below it (see FIG. 6B), so that contact portion 254 and member 236 come out of contact with each other. Thus, the movement of arm member 231 from standby position P31 to transfer position P32 and the movement of partition member 250 from first position P11 to second position P12 occur in conjunction with each other.

In the configuration example of FIGS. 6A to 6D, movement restriction member 300 is configured to move between third position P21 and fourth position P22 with movement of arm member 231. Arm member 231 and movement restriction member 300 are configured to move in conjunction with each other by using common drive source 233. In this way, the number of components can be smaller than when arm member 231 and movement restriction member 300 are driven by individual drive sources. Hence, the configuration of the apparatus can be simpler and the size of slide storage 140 can be smaller accordingly.

Specifically, as illustrated in FIG. 6B, movement restriction member 300 is supported by vertical pivot shaft 301 so as to be capable of pivoting in a horizontal plane. As illustrated in FIG. 6A, arm member 231 is provided with contact portion 237 extending in the X direction and then bent obliquely in the Y1 direction. Movement restriction member 300 is provided with contact portion 302 that contacts contact portion 237. As arm member 231 at standby position P31 is moved by drive source 233 in the third direction (X1 direction), contact portion 302 of movement restriction member 300 at third position P21 and contact portion 237 come into contact with each other, so that contact portion 302 is pushed in the third direction (X1 direction). Contact portion 302 thus moves such that it is pushed aside along contact portion 237, thereby pivoting movement restriction member 300 about pivot shaft 301. Consequently, as illustrated in FIG. 6C, movement restriction member 300 moves from third position P21, at which movement restriction member 300 projects from end wall portion 241, to fourth position P22, at which movement restriction member 300 is behind end wall portion 241.

Movement restriction member 300 is urged to third position P21 by torsion spring member 303 (see FIG. 6B) provided on pivot shaft 301. Then, when arm member 231 moves backward in the X2 direction from transfer position P32 toward standby position P31, contact portion 302 returns to the original position as contact portion 237 of arm member 231 moves, so that movement restriction member 300 pivots about pivot shaft 301 back to third position P21. Thus, the movement of arm member 231 from standby position P31 to transfer position P32 and the movement of movement restriction member 300 from third position P21 to fourth position P22 occur in conjunction with each other.

Figure 7:
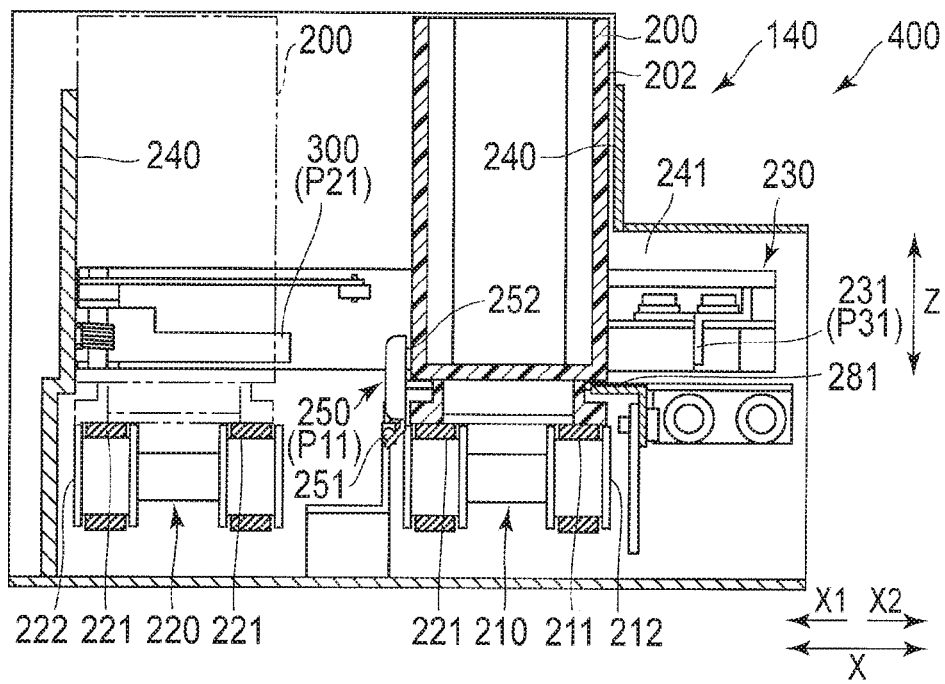
FIG. 7 is a schematic cross-sectional view of the slide storage taken along a third direction illustrating a state where a storage tool is disposed at the slide storage position.

As described above, in the configuration example of FIGS. 6A to 6D, arm member 231 of storage-tool movement mechanism 230, partition member 250, and movement restriction member 300 move in conjunction with each other by using common drive source 233. Thus, as illustrated in FIG. 7, in a state before the lateral transfer where storage tool 200 is disposed at slide storage position 121, arm member 231 is disposed at standby position P31, partition member 250 is disposed at first position P11, thereby forming part of sidewall portion 240, and movement restriction member 300 is disposed at third position P21.

To laterally transfer storage tool 200, arm member 231 is moved in the third direction (X1 direction) to come into contact with storage tool 200, which is disposed at slide storage position 121. At this point, partition member 250 has been moved to second position P12. Then, with the movement of arm member 231, storage tool 200 moves over surface 252 of partition member 250 at the third direction (X1 direction) to reception position 124. During the movement to reception position 124, movement restriction member 300 retracts to fourth position P22 (see FIG. 6C). As illustrated in FIG. 8, storage tool 200 is disposed at reception position 124 when arm member 231 reaches transfer position P32. As arm member 231 moves back to standby position P31, movement restriction member 300 moves to third position P21, thereby restricting movement of storage tool 200 disposed at reception position 124. Partition member 250 also moves to back first position P11.

(Alternative Configuration Examples of Partition Member)

Figure 9A:
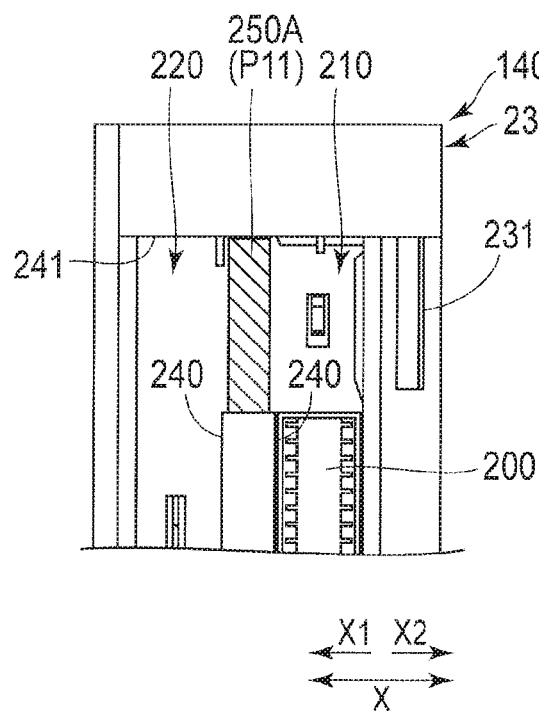
FIGS. 9A and 9B are plan views illustrating a first alternative configuration example of a partition member.
Figure 9B:
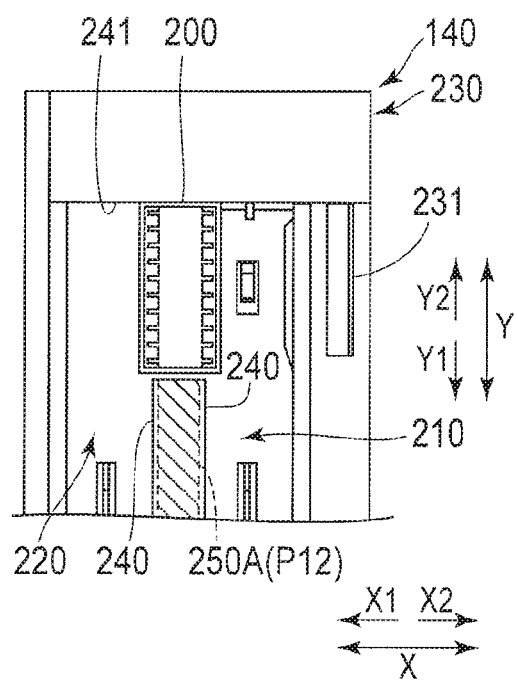

FIGS. 9A and 9B and FIGS. 10A and 10B illustrate alternative configuration examples of partition member 250. In the configuration example illustrated in FIGS. 9A and 9B, partition member 250A can move horizontally between first position P11 (see FIG. 9A) and second position P12 (see FIG. 9B). In FIGS. 9A and 9B, partition member 250A can move horizontally in the first direction (Y2 direction) and the second direction (Y1 direction). At first position P11, partition member 250A is disposed between slide storage position 121 and reception position 124. At second position P12, partition member 250A is stored inside sidewall portion 240 to open the space between slide storage position 121 and reception position 124.

Figure 10A:
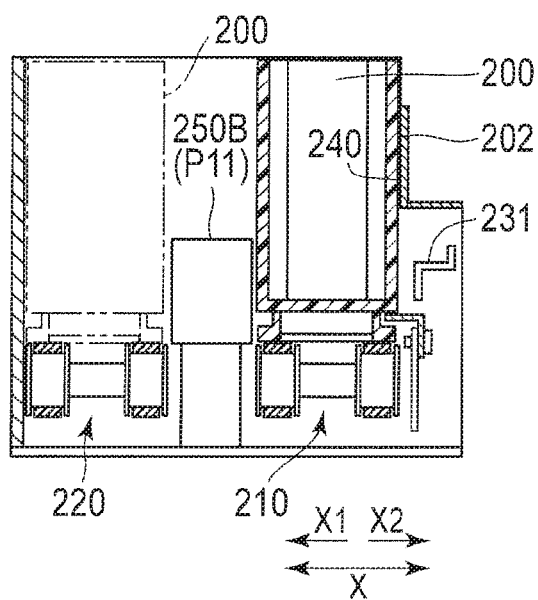
FIGS. 10A and 10B are plan views illustrating a second alternative configuration example of the partition member.
Figure 10B:
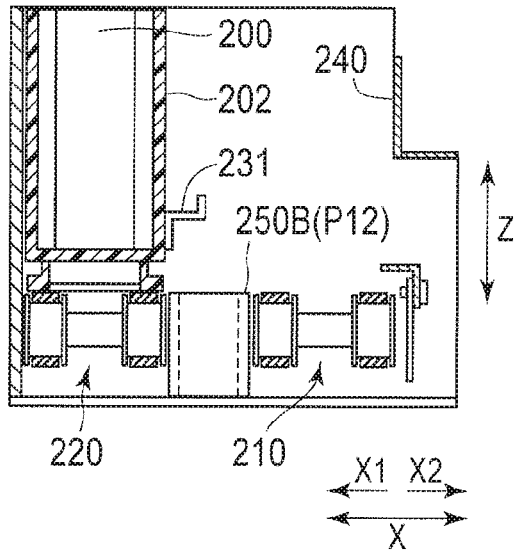

In the configuration example illustrated in FIGS. 10A and 10B, partition member 250B can move vertically between first position P11 (see FIG. 10A) and second position P12 (see FIG. 10B). At first position P11, partition member 250B is disposed between slide storage position 121 and reception position 124. At second position P12, partition member 250B is lowered to open the space between slide storage position 121 and reception position 124. At second position P12, the upper end surface of partition member 250B is disposed at substantially the same height position as the position of the upper surfaces of first transporter 210 and second transporter 220. The upper end surface of partition member 250B functions as a floor surface when storage tool 200 is laterally transferred.

(Staining Process Unit and Drying Process Unit)

Figure 11:
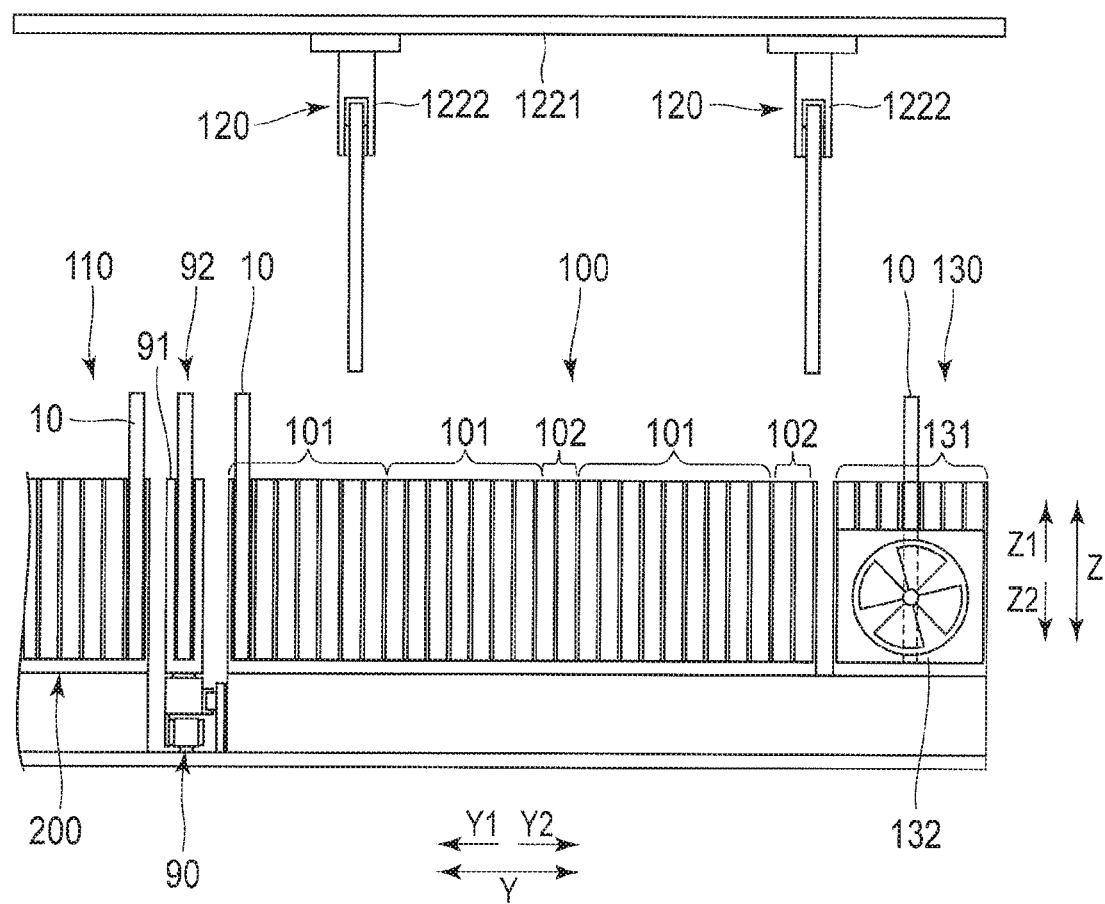
FIG. 11 is a schematic side view for explaining a staining process unit and a drying process unit.

In a configuration example of FIG. 11, staining process unit 100 includes staining tanks 101 and cleaning tanks 102. Staining tanks 101 and cleaning tanks 102 each have a container shape opened at the top and can store liquid therein. Microscope slides 10 can be set upright and side by side in the Y direction in each staining tank 101 and each cleaning tank 102. A predetermined staining solution is stored in staining tank 101, and a predetermined cleaning liquid is stored in cleaning tank 102. Meanwhile, FIG. 11 illustrates three staining tanks 101 and two cleaning tanks 102 for convenience. However, the number of staining tanks 101 and the number of cleaning tanks 102 may be set in accordance with the number of steps in the staining process and the number of steps in the cleaning process. Staining tanks 101 and cleaning tanks 102 are disposed side by side in the Y direction in the order of the steps of the processes. Microscope slides 10 are processed by being sequentially transported from the Y1 direction side toward the Y2 direction side to each tank and immersed in the staining solution or the cleaning liquid stored in that tank for a predetermined period of time.

First drying process unit 130 includes drying tank 131 and air fan 132 provided to drying tank 131. Drying tank 131 is opened at the top, and microscope slides 10 can be inserted thereinto. Microscope slides 10 can be set upright and side by side in the Y direction in drying tank 131. Air fan 132 blows air to microscope slides 10 held in drying tank 131. With this, first drying process unit 130 dries microscope slides 10 having finished the staining process.

In the configuration example of FIG. 11, staining tanks 101 and cleaning tanks 102 and drying tank 131 are disposed side by side in the Y direction. In other words, first drying process unit 130 is disposed as an extension of staining process unit 100, which extends in the Y direction. These staining process unit 100 and first drying process unit 130 are disposed adjacently alongside first transporter 210 and second transporter 220 in the X direction (see FIG. 2). Thus, the space in the apparatus in the left-right direction is efficiently utilized, thereby allowing reduction in size of the apparatus.

Slide transfer unit 120 includes movement mechanism 1221 provided at an upper portion of the apparatus and hand 1222 provided to movement mechanism 1221. Movement mechanism 1221 can move hand 1222 horizontally in the X direction and the Y direction. Slide transfer unit 120 grips microscope slide 10 having finished the staining and inserts it into storage tool 200. Hand 1222 can move in the Z direction and grip one microscope slide 10. In the illustrated example, hand 1222 is configured to grip microscope slide 10 by pinching it in its thickness direction with a pair of grip plates. Hand 1222 may be configured to pinch microscope slide 10 in the left-right direction.

In the configuration example of FIG. 11, two slide transfer units 120 are provided. Slide transfer unit 120 on the Y1 direction side can move to positions above slide setting unit 110, pick-up position 92, and staining process unit 100 and take microscope slide 10 in or out. Slide transfer unit 120 on the Y2 direction side can move to positions above staining process unit 100, first drying process unit 130, and slide storage position 121 (see FIG. 1) in slide storage 140, and staining process unit 100 and take microscope slide 10 in or out. Microscope slide 10 is transported to a given spot in staining process unit 100 by slide transfer unit 120 on the Y1 direction side and then transported to first drying process unit 130 and slide storage 140 by slide transfer unit 120 on the Y2 direction side. One slide transfer unit 120 or three or more slide transfer units 120 may be provided.

In the configuration example of FIG. 11, slide transfer unit 120 sequentially transfers microscope slides 10 having completed the staining process one by one from staining process unit 100 to drying tank 131 of first drying process unit 130. Slide transfer unit 120 sequentially transfers microscope slides 10 having completed the drying process one by one from first drying process unit 130 to storage tool 200 at slide storage position 121. In this way, unlike a configuration that transports microscope slides 10 at once, each microscope slide 10 can be transferred quickly to the next setting position when completing the staining process or the drying process. Thus, there is no unnecessary waiting time in the processes of each individual microscope slide 10, which improves the efficiency of the processes. Moreover, in the case of transporting microscope slides 10 at once, if the microscope slides are dried unevenly, they are transferred in an insufficiently dried state to storage tool 200, thereby possibly contaminating storage tool 200. However, in the above configuration, each of individual microscope slides 10 can be transferred individually to storage tool 200 after completing the drying process, which can prevent the contamination of storage tool 200. This eliminates the need for or facilitates operations of cleaning and drying storage tool 200.

(Smear Preparing Operation of Smear Preparing Apparatus)

An example of the smear preparing operation of smear preparing apparatus 400 is described with reference to FIG. 12. The control of smear preparing apparatus 400 is performed by controller 170.

First, the sample aspiration process is performed in step S1 in FIG. 12. Aspirator 160 aspirates a sample from sample container 151 transported to an aspiration position by sample transporter 150. In parallel with the process of step S1, microscope slide 10 is transported to attached-matter remover 70 in step S2. Specifically, microscope slide 10 is fed from slide feeder 20 to slide transporter 60. Then, microscope slide 10 held on slide transporter 60 is transported to attached-matter remover 70. In step S3, attached-matter remover 70 performs the attached-matter removal process on microscope slide 10 held on slide transporter 60.

In step S4, slide transporter 60 transports microscope slide 10 to print process unit 30. In step S5, print process unit 30 performs the print process on microscope slide 10 held on slide transporter 60.

In step S6, slide transporter 60 transports microscope slide 10 to smearing process unit 40. In step S7, smearing process unit 40 performs the smearing process on the microscope slide 10 held on slide transporter 60.

In step S8, delivery mechanism 80 transports microscope slide 10 from slide transporter 60 to second drying process unit 50. In step S9, second drying process unit 50 performs its drying process on the sample smeared on microscope slide 10.

In step S10, slide transporter 90 transports microscope slide 10 to pick-up position 92 (see FIG. 1). Specifically, delivery mechanism 80 passes microscope slide 10 from second drying process unit 50 into housing unit 91 of slide transporter 90. Slide transporter 90 transports microscope slide 10 set in housing unit 91 to pick-up position 92.

In step S11, microscope slide 10 is transported to staining process unit 100. Specifically, slide transfer unit 120 takes microscope slide 10 out of slide transporter 90 at pick-up position 92 and transfers it to staining process unit 100. In step S12, staining process unit 100 performs the staining process on the sample smeared on microscope slide 10. Microscope slide 10 is transferred to the staining tanks and the cleaning tanks one after another in the order of the steps in the process. In this process, microscope slide 10 moves from the Y1 direction side to the Y2 direction side in staining process unit 100.

In step S13, slide transfer unit 120 transfers microscope slide 10 from staining process unit 100 to first drying process unit 130. Specifically, slide transfer unit 120 passes microscope slide 10 from staining process unit 100 to first drying process unit 130. In step S14, first drying process unit 130 performs its drying process on the smeared and stained sample on microscope slide 10.

In step S15, microscope slide 10 is transported to slide storage 140. Specifically, slide transfer unit 120 sets microscope slide 10 from first drying process unit 130 into storage tool 200 disposed at slide storage position 121 in slide storage 140. Storage tool 200 is then transported to storage-tool collection position 123. Microscope slide 10 with the smear prepared thereon is kept at storage-tool collection position 123 in slide storage 140. The smear preparing process is then terminated.

Note that, in the smearing mode, the process is terminated when slide transfer unit 120 transports microscope slide 10 transported to pick-up position 92 in step S10 to slide setting unit 110. From slide setting unit 110, the user can collect microscope slide 10 which has undergone the print process and the smearing process but has an unstained sample.

In the staining mode, the processes of and after step S11 are performed on microscope slide 10 which has finished the smearing and been set to slide setting unit 110 by the user. In this case, slide transfer unit 120 transports microscope slide 10 from slide setting unit 110 to staining process unit 100.

Note that all the features in one or more embodiments disclosed this time should be considered exemplary and non-limiting. The scope of the invention is defined not by the above description of one or more embodiments but by the scope of claims, and also encompasses all changes (modifications) within meanings and scopes equivalent to the scope of claims.

One or more embodiments may be specified as follows.

In the smear preparing apparatus, wherein the slide setting unit may be at a position aligned with the storage-tool setting position and the storage-tool collection position in the third direction.

In the smear preparing apparatus, wherein the first transporter may transport the storage tool in the first direction from a storage-tool setting position at which the storage tool housing no microscope slide stored therein toward a slide storage position at which the slide transfer unit transfers a microscope slide having a stained sample to the storage tool.

In the smear preparing apparatus, wherein the first direction may be a direction toward a far side of an apparatus body, and the second direction may be a direction toward a near side of the apparatus body.

In the related art, smear preparing apparatuses include many process parts that perform a print process, a smearing process, a drying process, and the like on a microscope slide. Hence, the apparatuses tend to be large in size. However, since many testing apparatuses are installed in hospitals and testing facilities, smear preparing apparatuses are desired to be smaller in size to save the installation space.

Also, in smear preparing apparatuses, the user sets empty storage tools and collects storage tools storing microscope slides processed by the smear preparing apparatuses. Hence, it is desired to facilitate the operations of setting and collecting storage tools and thereby improve the usability.

According to the embodiments described above, a smear preparing apparatus and a smear preparing method are provided that facilitate operations to be performed by the user while reducing the size of a smear preparing apparatus by reducing the dimension, in the left-right direction, of a transporter that transports storage tools for microscope slides.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

The invention claimed is:

1. A smear preparing apparatus comprising:
   a staining process unit that stains a sample smeared on a microscope slide,
   a first transporter that transports a storage tool in a first direction, the storage tool capable of holding microscope slides side by side in the first direction;
   a slide transfer unit that transfers a microscope slide having the smeared sample stained by the staining process unit to the storage tool transported by the first transporter; and
   a second transporter that is adjacent to the first transporter and that transports the storage tool holding the microscope slide transferred by the slide transfer unit, in a second direction opposite to the first direction.

2. The smear preparing apparatus according to claim 1, further comprising a storage-tool movement mechanism that moves the storage tool from the first transporter to the second transporter.

3. The smear preparing apparatus according to claim 2, wherein the storage-tool movement mechanism moves the storage tool in a third direction perpendicular to the first direction from a slide storage position on the first transporter to a reception position on the second transporter.

4. The smear preparing apparatus according to claim 3, further comprising a partition member that is positioned at the slide storage position between the first transporter and the second transporter and that moves between a first position at which a movement of the storage tool in the third direction is restricted and a second position at which a movement of the storage tool in the third direction is permitted.

5. The smear preparing apparatus according to claim 4, wherein the partition member pivots between
the first position at which the partition member is stood upright to block passage between the first transporter and the second transporter, and
the second position at which the partition member is laid to permit passage between the first transporter and the second transporter.

6. The smear preparing apparatus according to claim 5, wherein
the partition member is positioned at the first position while the slide transfer unit transfers the microscope slide having the smeared stained sample to the storage tool at the slide storage position, and
the partition member is positioned at the second position when the storage tool storing the microscope slide having the smeared stained sample is moved from the first transporter toward the second transporter.

7. The smear preparing apparatus according to claim 5, wherein
the storage-tool movement mechanism includes an arm member that moves in contact with the storage tool to move the storage tool in the third direction from the first transporter to the second transporter,
the partition member pivots in the third direction between the first position and the second position with a movement of the arm member, and
the arm member and the partition member move in conjunction with each other by using a drive source common thereto.

8. The smear preparing apparatus according to claim 4, wherein
the first transporter further includes sidewall portions extending along the first direction, and
at the first position, the partition member is positioned substantially straight along the first direction alongside the sidewall portion of the first transporter on the second transporter side.

9. The smear preparing apparatus according to claim 1, wherein the storage tool stores a microscope slide upright from an opening positioned at a top of the storage tool.

10. The smear preparing apparatus according to claim 1, wherein
the first transporter transports the storage tool from a storage-tool setting position at an end of the first transporter in the second direction to a slide storage position,
the second transporter transports the storage tool to a storage-tool collection position at an end of the second transporter in the second direction, and
the smear preparing apparatus further comprises a cover that is positioned over the first transporter and the second transporter and that covers the slide storage position but exposes at least the storage-tool setting position on the first transporter and the storage-tool collection position on the second transporter to outside.

11. The smear preparing apparatus according to claim 1, wherein the staining process unit is positioned alongside the first transporter at a position on an opposite side of the first transporter from the second transporter, and the staining process unit causes a staining process of samples smeared on the microscope slides to be completed at an end of the staining process unit in the first direction.

12. The smear preparing apparatus according to claim 11, further comprising a first drying process unit that is at a position on the first direction side relative to the staining process unit and aligned with a slide storage position in a third direction perpendicular to the first direction, and that dries the microscope slide having the smeared stained sample,
wherein the slide transfer unit transfers the microscope slide having the smeared stained sample from the first drying process unit to the storage tool at the slide storage position.

13. The smear preparing apparatus according to claim 12, wherein the slide transfer unit transfers a microscope slide in the first direction from the staining process unit to the first drying process unit.

14. The smear preparing apparatus according to claim 12, wherein
the staining process unit, the first drying process unit, and the storage tool at a slide storage position all hold microscope slides in a same orientation, and
the slide transfer unit transfers a microscope slide between the staining process unit, the first drying process unit, and the storage tool at the slide storage position.

15. The smear preparing apparatus according to claim 1, further comprising a slide feeder that is capable of holding microscope slides to be processed and feeds the microscope slides to be processed,
wherein the first transporter transports the storage tool from a storage-tool setting position at an end of the first transporter in the second direction to a slide storage position,
the second transporter transports the storage tool to a storage-tool collection position at an end of the second transporter in the second direction, and
the slide feeder is at a position aligned with the storage-tool setting position and the storage-tool collection position in a third direction perpendicular to the first direction.

16. The smear preparing apparatus according to claim 15, further comprising:
a print process unit that is positioned in the first direction relative to the slide feeder and that performs a print process which prints on a microscope slide; and
a slide transporter that transports a microscope slide in the first direction between the slide feeder and the print process unit.

17. The smear preparing apparatus according to claim 16, further comprising:
a smearing process unit that is positioned in the third direction relative to the print process unit and that performs a smearing process for smearing a sample onto a microscope slide;
a second drying process unit that is positioned in the second direction relative to the smearing process unit and that dries a sample on a microscope slide processed with the smearing process; and
a delivery mechanism that transports a microscope slide in the second direction from the smearing process unit to the second drying process unit.

18. The smear preparing apparatus according to claim 15, further comprising:
a slide setting unit that is positioned in the second direction relative to the staining process unit and that holds a microscope slide such that the microscope slide is capable of being taken in and out,
wherein the slide transfer unit transfers a microscope slide in the first direction from the slide setting unit to the staining process unit.

19. A smear preparing apparatus comprising:
  a staining process unit that stains a sample smeared on a microscope slide;
  a slide storage including
    a first transporter that transports a storage tool capable of storing microscope slides in a first direction from a first position at which the storage tool is set toward a second position different from the first position, and
    a second transporter that is adjacent to the first transporter and that transports the storage tool in a second direction opposite to the first direction from a third position at which the storage tool transported to the second position is received toward a fourth position at which the storage tool is taken out; and
  a slide transfer unit that grips a microscope slide having a stained sample and inserts the microscope slide into the storage tool at a predetermined position on one of the first transporter and the second transporter, wherein
  the staining process unit is configured to position microscope slides therein side by side along the first direction.

* * * * *